(12) United States Patent
Laroia

(10) Patent No.: US 9,948,832 B2
(45) Date of Patent: Apr. 17, 2018

(54) METHODS AND APPARATUS FOR SYNCHRONIZED IMAGE CAPTURE IN A DEVICE INCLUDING OPTICAL CHAINS WITH DIFFERENT ORIENTATIONS

(71) Applicant: THE LIGHTCO INC., Palo Alto, CA (US)

(72) Inventor: Rajiv Laroia, Far Hills, NJ (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 15/190,156

(22) Filed: Jun. 22, 2016

(65) Prior Publication Data

US 2017/0374240 A1    Dec. 28, 2017

(51) Int. Cl.
*H04N 7/18* (2006.01)
*H04N 5/04* (2006.01)
(Continued)

(52) U.S. Cl.
CPC ............... *H04N 5/04* (2013.01); *G06T 11/60* (2013.01); *H04N 5/2257* (2013.01); *H04N 5/23232* (2013.01); *H04N 5/247* (2013.01)

(58) Field of Classification Search
CPC ........... G06K 7/10722; G06K 7/10752; G06K 7/10732; H04N 5/23219; H04N 13/0203;
(Continued)

(56) References Cited

U.S. PATENT DOCUMENTS 4,890,133 A    12/1989  Ogawa et al.
5,078,479 A    1/1992   Vuilleumier
(Continued)

FOREIGN PATENT DOCUMENTS

EP    2642757 A2    9/2013
JP    10091765      4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Trung Diep
(74) *Attorney, Agent, or Firm* — Straub & Straub; Michael P. Straub; Stephen T. Straub

(57) ABSTRACT

Camera device including multiple optical chains, e.g., camera modules, some of which have different orientations relative to the base of the camera device and methods of using such a camera device are described. The orientation of the camera modules within the camera device is taken into consideration when determining the direction in which lines of the sensors of the individual camera modules are read out. Information with regard to the read out direction to be used with particular camera modules is stored in some embodiments and used to control the readout of sensors, e.g., sensors which use a rolling shutter to capture images of a scene area. The sensors may have the same field of view or overlapping fields of view.

21 Claims, 17 Drawing Sheets

(51) Int. Cl.
   *H04N 5/225* (2006.01)
   *H04N 5/232* (2006.01)
   *H04N 5/247* (2006.01)
   *G06T 11/60* (2006.01)

(58) Field of Classification Search
   CPC .... H04N 13/0239; H04N 5/225; H04N 5/232; H04N 5/23254
   See application file for complete search history.

(56) References Cited

U.S. PATENT DOCUMENTS

| | | |
|---|---|---|
| 5,353,068 A | 10/1994 | Moriwake |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 * | 4/2013 | Tardif ................ G06T 11/00 382/282 |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Ciurea et al. |
| 8,639,296 B2 | 1/2014 | Ahn et al. |
| 8,665,341 B2 | 3/2014 | Georgiev et al. |
| 8,666,239 B2 | 3/2014 | Ibi et al. |
| 8,704,944 B1 | 4/2014 | Wierzoch et al. |
| 8,780,258 B2 | 7/2014 | Lee |
| 8,896,655 B2 | 11/2014 | Mauchly et al. |
| 9,041,826 B2 | 5/2015 | Jung et al. |
| 9,188,837 B2 | 11/2015 | Ishii |
| 9,282,228 B2 | 3/2016 | Laroia |
| 9,374,514 B2 | 6/2016 | Laroia |
| 2002/0149691 A1 | 10/2002 | Pereira et al. |
| 2003/0020814 A1 | 1/2003 | Ono |
| 2003/0185551 A1 | 10/2003 | Chen |
| 2004/0227839 A1 | 11/2004 | Stavely et al. |
| 2006/0067672 A1 | 3/2006 | Washisu et al. |
| 2006/0165403 A1 | 7/2006 | Ito |
| 2006/0187338 A1 | 8/2006 | May et al. |
| 2006/0221218 A1 | 10/2006 | Alder et al. |
| 2006/0238886 A1 | 10/2006 | Kushida et al. |
| 2007/0050139 A1 | 3/2007 | Sidman |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2010/0013906 A1 | 1/2010 | Border et al. |
| 2010/0045774 A1 | 2/2010 | Len et al. |
| 2010/0053414 A1 | 3/2010 | Tamaki et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0093842 A1 | 4/2013 | Yahata |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0168424 A1 * | 6/2014 | Attar .................. G01C 3/10 348/140 |
| 2014/0184883 A1 * | 7/2014 | Shimamoto ......... G03B 3/00 348/345 |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0241713 A1 | 8/2015 | Laroia et al. |
| 2015/0253647 A1 | 9/2015 | Mercado |
| 2015/0279012 A1 | 10/2015 | Brown et al. |
| 2015/0296154 A1 | 10/2015 | Laroia |
| 2016/0142610 A1 | 5/2016 | Rivard et al. |
| 2016/0191759 A1 * | 6/2016 | Somanath ......... H04N 5/23212 348/349 |
| 2017/0187798 A1 * | 6/2017 | Garces-Erice ...... H04L 67/1046 |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |

(56) References Cited

FOREIGN PATENT DOCUMENTS

| | | |
|---|---|---|
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

Notification of Transmittal of the International Search Report and the Written Opinion of the International Searching Authority, or the Declaration including the International Search Report and the Written Opinion of the International Searching Authority from PCT/US2017/038614, dated Oct. 12, 2017, pp. 1-6.

\* cited by examiner

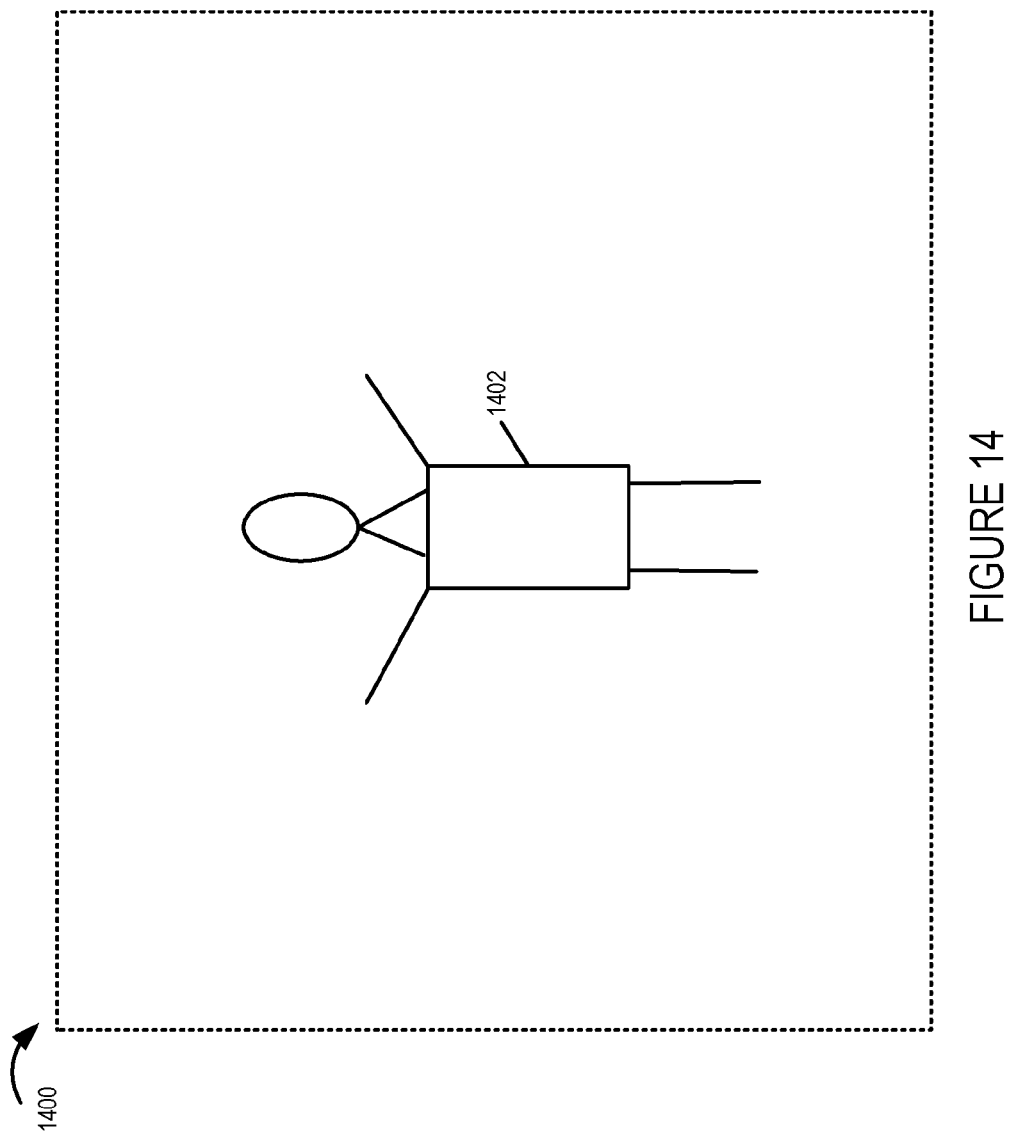

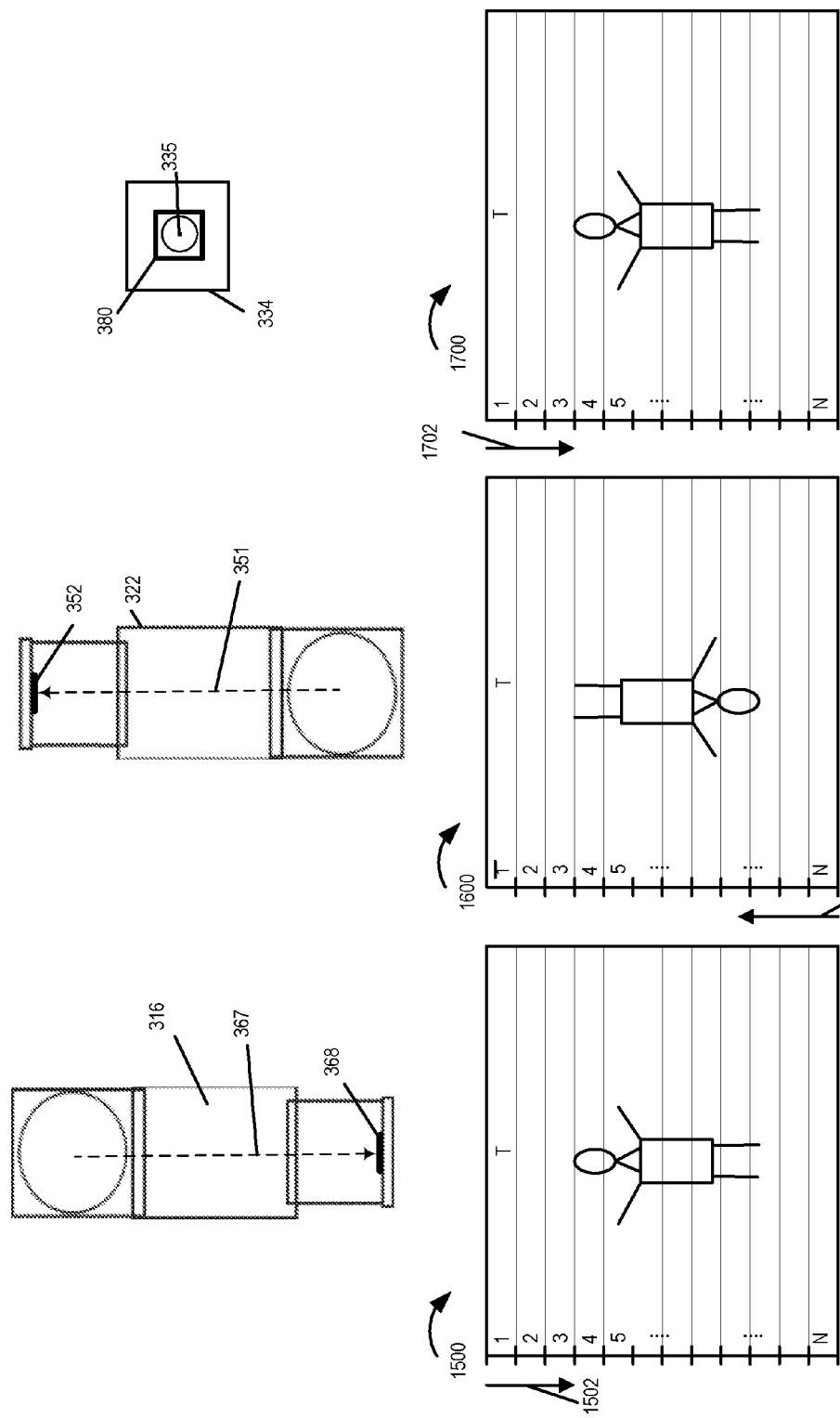

| OPTICAL CHAIN | READ OUT ORDER | WITH MIRROR |
|---|---|---|
| OC 302 | FIRST | Y |
| OC 304 | SECOND | Y |
| OC 306 | FIRST | Y |
| OC 308 | SECOND | Y |
| OC 310 | FIRST | Y |
| OC 312 | SECOND | Y |
| OC 314 | FIRST | Y |
| OC 316 | FIRST | Y |
| OC 318 | FIRST | Y |
| OC 320 | SECOND | Y |
| OC 322 | SECOND | Y |
| OC 324 | SECOND | Y |
| OC 326 | FIRST | N |
| OC 328 | FIRST | N |
| OC 330 | FIRST | N |
| OC 332 | FIRST | N |
| OC 334 | FIRST | N |

FIGURE 19

METHODS AND APPARATUS FOR SYNCHRONIZED IMAGE CAPTURE IN A DEVICE INCLUDING OPTICAL CHAINS WITH DIFFERENT ORIENTATIONS

FIELD

The present application relates to image capture and generation methods and apparatus and, more particularly, to methods and apparatus related to controlling elements of a camera, e.g., controlling sensors of different optical chains, to capture images in a synchronized manner.

BACKGROUND

In camera devices with multiple optical chains, e.g., camera modules, images are captured by individual camera modules. The images are then sometimes used to generate a composite image.

In the case of camera modules which use rolling shutters, different portions of an image are exposed, e.g., captured, and then read out at different times. Over time objects in a scene area may move, particularly in the case where an image includes individuals or objects which may be in motion. Since camera modules which use sensors with rolling shutters capture different portions of a scene at different times, within a single image this may cause some distortions, e.g., a streak, in the direction of motion and/or other image distortions.

In camera devices with multiple optical chains, image capture is often controlled so that each of the sensors captures and reads out lines of an image, e.g., rows of pixel values, from one edge of a sensor to another with all the sensors of the camera device proceeding in the same direction, e.g., from top to bottom, in terms of reading out of rows of pixel values as part of a rolling shutter operation.

This approach can work well for some systems where the optical chains and/or corresponding sensors are arranged in a uniform array. However, in the case of non-uniform camera module arrangements where some sensors may be oriented differently from other sensors, this can result in different areas of a scene being captured at different time periods with, for example, some camera modules capturing the top of a scene area while other camera modules are capturing the bottom of the scene area due to the different orientations of the camera modules. Such different orientations are particularly possible in the case where mirrors are used in camera modules and the camera modules have various orientations within a camera device in order to facilitate including multiple camera modules in the limited space available in a camera device.

In view of the above discussion it should be appreciated that there is a need for methods and apparatus which allow images captured by different camera modules, e.g., optical chains, to be captured in a manner that takes into consideration the orientation and/or configuration of a camera module. In the case of camera devices with one or more sensors which use a rolling shutter, it would be desirable if the orientation of the camera module and/or sensor in a camera module could be taken into consideration when controlling the readout of lines of pixel values to reduce or avoid differences between the time different modules capture the same portion of a scene as compared to the case where all camera modules capture images using the same direction of sensor read out.

SUMMARY

Various features of the present invention relate to controlling sensor readout in a camera device including multiple optical chains, e.g., camera modules, with different orientations within the camera device.

In various embodiments, the physical orientation of optical chains and/or sensors within the optical chains is taken into consideration in determining the direction in which lines of pixel values are to be read out from the sensor. In various embodiments at least some sensors can be controlled, through use of control signaling, to read out lines in one of two directions with respect to first and second physical edges of the sensors. In some, but not necessarily all, embodiments the first edge is the top of the sensor and the second edge is the bottom of the sensor and the two directions of read out are: 1) from top to bottom and 2) from bottom to top. As should be appreciated in other embodiments the first edge could be the left side of the sensor and the second edge the right side of the sensor.

In at least some embodiments, the sensors are sensors which use rolling shutters and the capture and readout of pixel values corresponding to lines of an image occur in a sequential manner. Information is stored in memory indicating whether the sensors of individual camera modules are to be read out in the first direction or the second direction. The order of readout takes into consideration the physical arrangement of the camera modules in the camera device and/or the construction of the camera module being controlled, e.g., whether or not it includes a mirror.

In some embodiments, sensors of different optical chains, e.g. camera modules, are controlled to read out in different directions. For example, a first camera module with a mirror and having an optical path extending in a direction towards the base, e.g., bottom, of the camera device is controlled in one embodiment to read out rows of pixel values in a first direction, e.g., from a top of a sensor to the bottom of the sensor. In the same exemplary embodiment a camera module with a mirror and having an optical path extending towards the top of the camera device is controlled to read out pixel values in a second direction, e.g., from the bottom of a sensor in the second camera module to the top of the sensor. In this way, the camera modules will capture the same portion of a scene area in the field of view of the first and second camera modules at the same or approximately the same time even though the orientation of the camera modules is different. In some embodiments the camera device also includes camera modules with optical paths extending towards the back of the camera device and which do not include mirrors. Such camera modules are controlled to read out lines in one of the first and second directions, e.g., in the first direction in some embodiments.

Optical chains which are positioned at angles to the bottom of the camera, and include mirrors are controlled taking into consideration the orientation of the modules and/or the direction of the optical paths within the camera module. For example, camera modules with mirrors and optical paths extending towards the bottom of the camera are controlled in one embodiment to read out pixel values in the first direction while camera modules with mirrors and optical paths extending towards the top of the camera are controlled to read out pixel values in the second direction.

It should be appreciated that at least in some embodiments camera modules oriented in opposite directions, e.g., 180 degrees apart from each other, are controlled to read out lines of pixel values in opposite directions.

Within camera modules oriented at non-perpendicular angles relative to the base of the camera device, the sensors may be mounted at angles with respect to the base of the circuit boards and/or base of the camera modules in which the sensor is located. The base of camera modules including mirrors may be, and in some embodiments are, parallel to the back and/or front face of the camera device. Camera modules which do not include mirrors may, and sometimes, do have their sensors mounted to printed circuit boards which are mounted parallel to the back of the camera.

By reversing direction in which camera modules read out rows of pixel values depending on their orientation in the camera device, different modules having the same sensor orientation with respect to the bottom of the camera module can be placed at different angles relative to the bottom of the camera but with the lines of a scene being captured in the same direction, thanks to the control of the order in which lines are read out of the camera modules based on the orientation of the modules.

It should be appreciated that in some embodiments multiple camera modules of each type are included in a camera device. By using sets of camera modules with different sensor orientations and mirrors, a wide range of camera module mounting positions can be supported. Thus, camera modules with mirrors can easily be mounted at a wide range of angles relative to the bottom of the camera case, with the sensor orientation in the camera modules varying in a manner that corresponds to the camera module mounting angles that are used.

Numerous additional features and embodiments, and variations are discussed and described in the detailed description which follows.

BRIEF DESCRIPTION OF THE FIGURES

FIG. 14 illustrates a scene area.

FIG. 16A illustrates an image of the scene area shown in FIG. 14 that can be captured by a camera module also shown in FIG. 16A.

FIG. 16B illustrates an image of the scene area shown in FIG. 14 that can be captured by a camera module also shown in FIG. 16B.

FIG. 17 illustrates an image of the scene area shown in FIG. 14 that can be captured by a camera module also shown in FIG. 17.

FIG. 19 shows a table of stored information including read out order control information for sensor of multiple camera modules identified in the table and which can be used in the camera device shown in any of the figures of the present application including FIGS. 1, 2, 3A and 3B.

DETAILED DESCRIPTION

Figure 1:
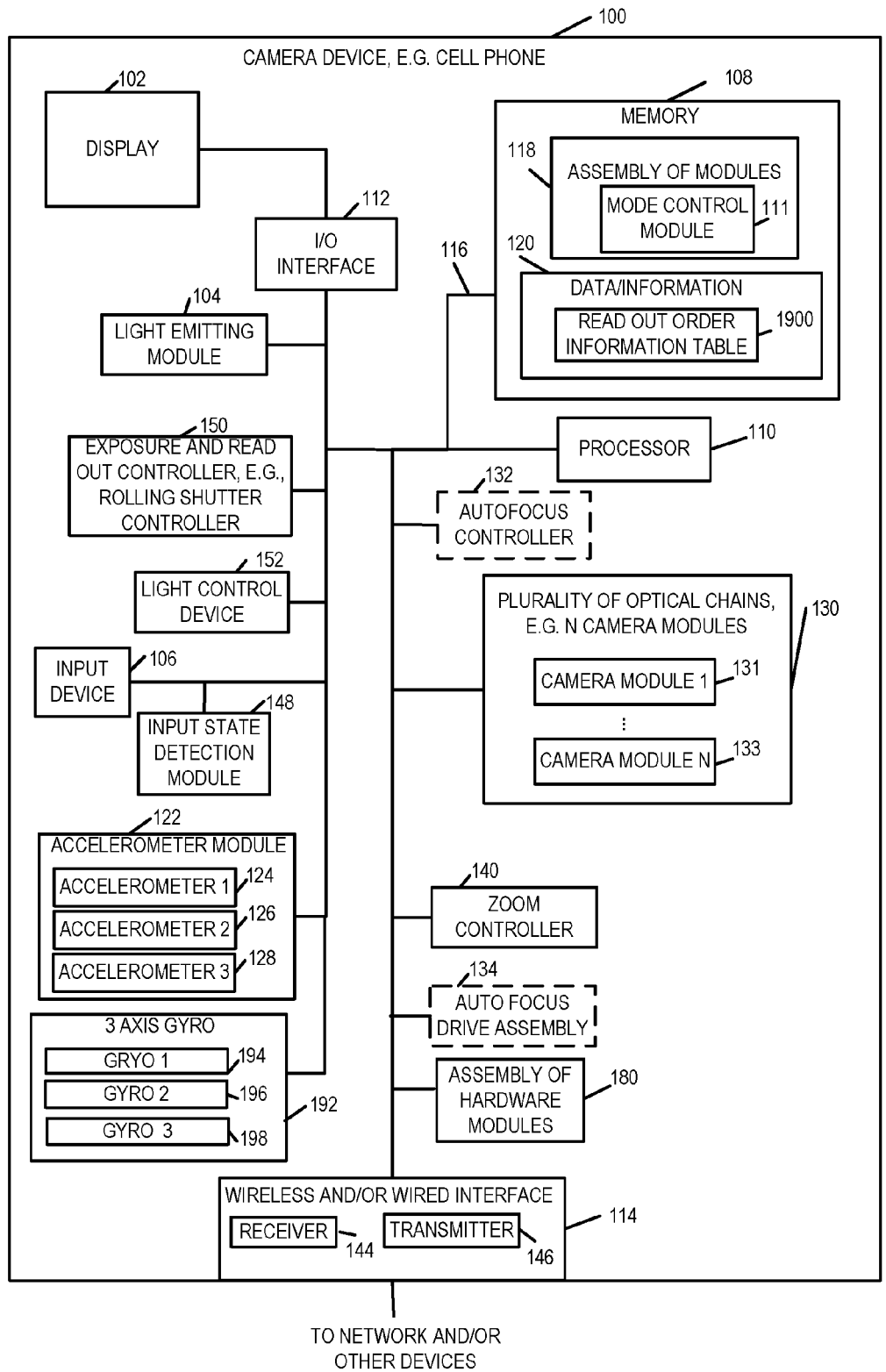
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. While the camera device 100 includes a plurality of camera modules 131, 133 depending on the embodiment the camera device maybe a single camera module 131 or 133.

However, to facilitate an appreciation of the invention and the benefits of using sensors with different orientations, e.g., rotated at different angles relative to a reference surface or edge, various features will be discussed in the context of an exemplary camera device in the form of a camera which includes multiple camera modules 131, 133.

The camera device 100, in some embodiments, is a portable device. In other embodiments, the camera device 100 is a fixed device such as a wall mounted camera. The camera device 100 includes multiple optical chains, e.g., camera modules, one or more of which have a rotated sensor in some embodiments with a sensor of another camera module being unrotated. As will be discussed below one or more of the camera modules 131, 133 may include a mirror. The camera modules 131, 133 are normally mounted to a mounting surface, e.g., rigid metal board which serves as a mounting board for one or more camera components. The mounting board may include holes allowing light to enter the lenses of one or more optical chains when the mounting board is located at the front of the camera 100.

FIG. 1 illustrates the camera device 100 in block diagram form showing the connections between various elements of the device 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a WIFI interface, and/or a USB interface, an I/O interface 112, an accelerometer module 122, 3 axis gyro 192, and a bus 116 which are mounted in a housing represented by the rectangular box touched by the line leading to reference number 800. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 800 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch sensitive screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The display device maybe mounted in the back of a camera case which serves as a shell in which the camera components are mounted. Reference number 100 which is used to indicate the camera device can also be used to indicate the camera case since it is the case in which the other components shown in block form in FIG. 1 are mounted. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 9:
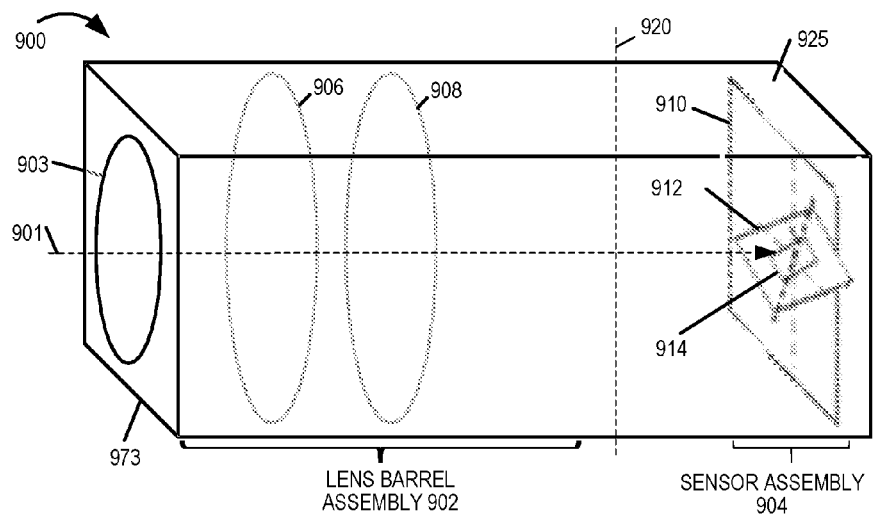
FIG. 9 illustrates an assembly of components used in an exemplary camera module, e.g., optical chain, which is used in a camera device in some embodiments.
Figure 10:
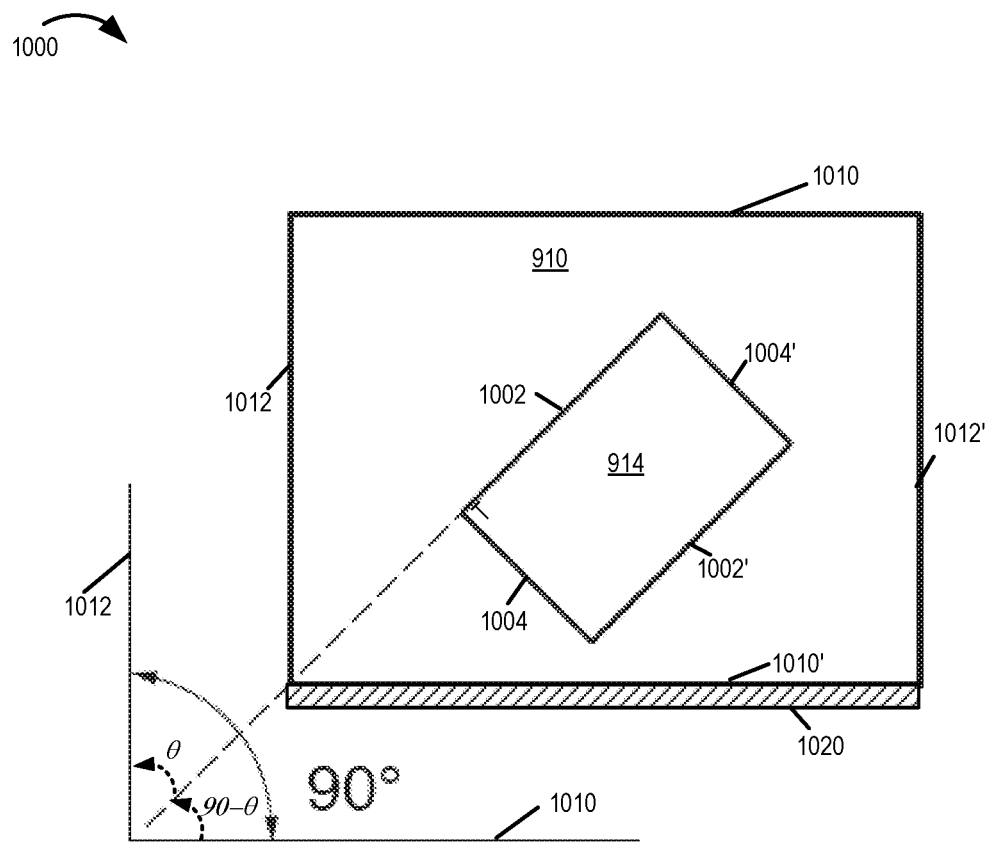
FIG. 10 is a drawing illustrating the alignment of the optically active area of an image sensor relative to a sensor mounting board.
Figure 11:
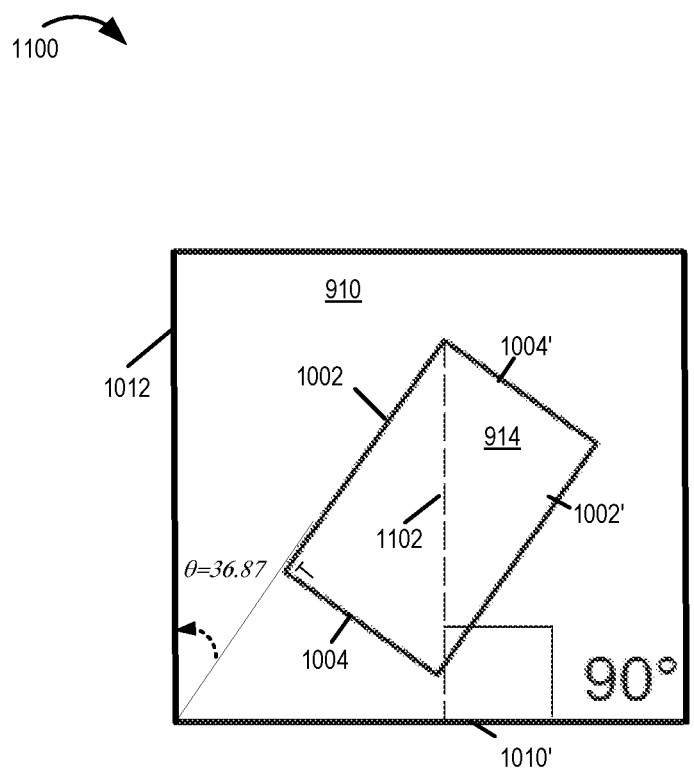
FIG. 11 illustrates a drawing showing the arrangement of an exemplary sensor on the sensor mounting board in one exemplary embodiment for a specific value of the angle "θ" used in some embodiments.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera modules and/or arrangements described in the present application. For example, in some embodiments the camera device 100 is implemented using a set of camera modules with rotated sensors as shown in FIGS. 9-11. In some embodiments the camera device 100 is implemented uses the camera modules of the type shown in FIG. 3, with some camera modules having rotated sensor as shown and discussed further with regard to FIGS. 9-11 while other camera modules having unrotated sensor as shown and discussed further with regard to FIGS. 4-6. Images captured by individual optical chains in the plurality of optical chains 130 can, and in various embodiments are, stored in memory 108, e.g., as part of the data/information 120 and processed by the processor 110, e.g., to generate one or more composite images. Data/information sometimes includes a table 1900 including sensor readout order information which is used by the read out controller 150 to determine the order in which lines of individual sensors for which information is provided in the table should be read out, e.g., in the case where multiple camera modules are being used in parallel to capture an image of one or more portions of a scene area. The expose and/or readout of sensors of different camera modules may occur in parallel but the order in which lines of the individual sensors are exposed and read out may be and sometimes is based on camera module orientation with the orientation of individual camera modules having been taken into consideration in the information stored in the table 1900.

The X camera modules 131 through 133 may, and in various embodiments do, include camera modules having different focal lengths. Multiple camera modules may be provided at a given focal length. Some camera modules may include mirrors while other camera modules may not include mirrors as will be discussed further below with regard to FIG. 3. As will be discussed below, different camera modules may have different rotations or orientations with respect to the mounting surface of the individual camera module depending on the angle the individual camera module is mounted in the camera device 100. The camera device 100 is to be considered exemplary and a wide variety of different types of camera devices maybe implemented and use one or more features of the invention.

Images from different camera modules captured at the same time or during a given time period can be combined to generate a composite image, e.g., an image having better resolution, frequency content and/or light range than an individual image captured by a single one of the camera modules 131, 133. Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network. The interface 114 of the camera device 100 may be, and in some instances is, coupled to a computer so that image data may be processed on the external computer.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

While the outside opening of each camera module maybe protected by a lens having an optical power in some embodiments a flat piece of glass or plastic is used to cover the opening of a camera module having little or no concentrating or dispersing light ray characteristics. Such a flat piece of glass or plastic may have a zero or near zero optical power or light dispersion effects but will still be referred to as a lens for purposes of discussing the camera exemplary camera device.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments. While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target. The zoom control module 140 is configured to perform a zoom operation in response to user input.

The processor 110 controls operation of the camera device 100 to control the elements of the camera device 100 to implement the methods of the invention. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods of the present invention. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Figure 2:
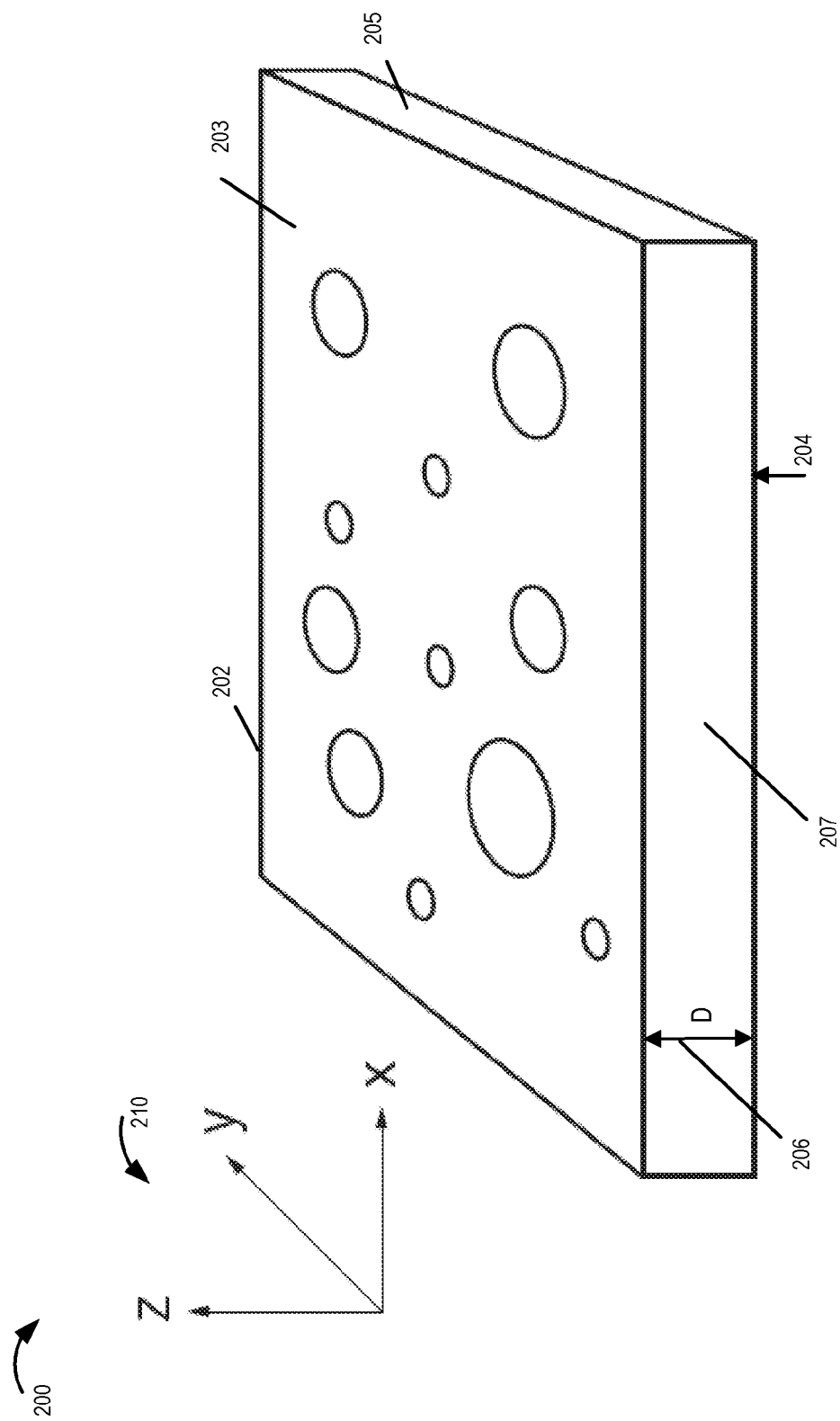
FIG. 2 illustrates a perspective view of an exemplary camera device which includes a plurality of the optical chains, e.g., camera modules.

FIG. 2 illustrates a perspective view 200 of an exemplary camera device 202 which includes a plurality of the optical chains, e.g., camera modules. The camera device 202 maybe the same or similar to the camera device 100 shown in FIG. 1. The front 203 of the camera 202 can be seen to include a plurality of openings (represented by a circle for simplicity) via which light enters the camera modules and proceeds along the camera modules to the corresponding image sensors in the camera modules. The front 203 of the camera can server as a mounting board to which optical modules can be secured. Alternatively a camera module mounting board maybe positioned behind the face 203 of the camera module or at the back of the camera. In one such embodiment the camera modules are secured to a mounting modules positioned parallel to and behind the front 203 of the camera device 202. Reference number 205 is used to refer to the case of the camera device 202 which may include the front portion 203 as well as a back, bottom 207, top and sides. The display maybe mounted in the back of the case 205 and is thus not visible in FIG. 2. a Larger circles correspond to optical chains with larger apertures and focal lengths. The number of openings shown in the figures corresponding to the optical chains is merely exemplary. Drawing 210 shows X-Y-Z axis to provide a perspective of the layout of the camera 202 and to facilitate better understanding of the discussion which follows. The depth "D" 206, represents the thickness of the camera 202 from the front surface 203 of the camera to the back/rear surface 204 of the camera, extends along what is identified in the figure as the Z-axis. While not shown in FIG. 2, it should be appreciated that camera device 202 may and in some embodiments does include the same or similar elements as camera device 100 of FIG. 1. Thus it should be appreciated that camera device 202 includes various elements such as the processor 110, memory 108, zoom controller 140, exposure and read out controller 1, accelerometer, gyro, autofocus controller etc., and various other elements discussed above with regard to camera devices 100.

As discussed above, the exemplary camera device may include a plurality of different camera modules mounted at different angles relative to a reference surface such as the mounting board on which the modules are mounted or the bottom of the camera device in which the camera modules are included.

Figure 3A:
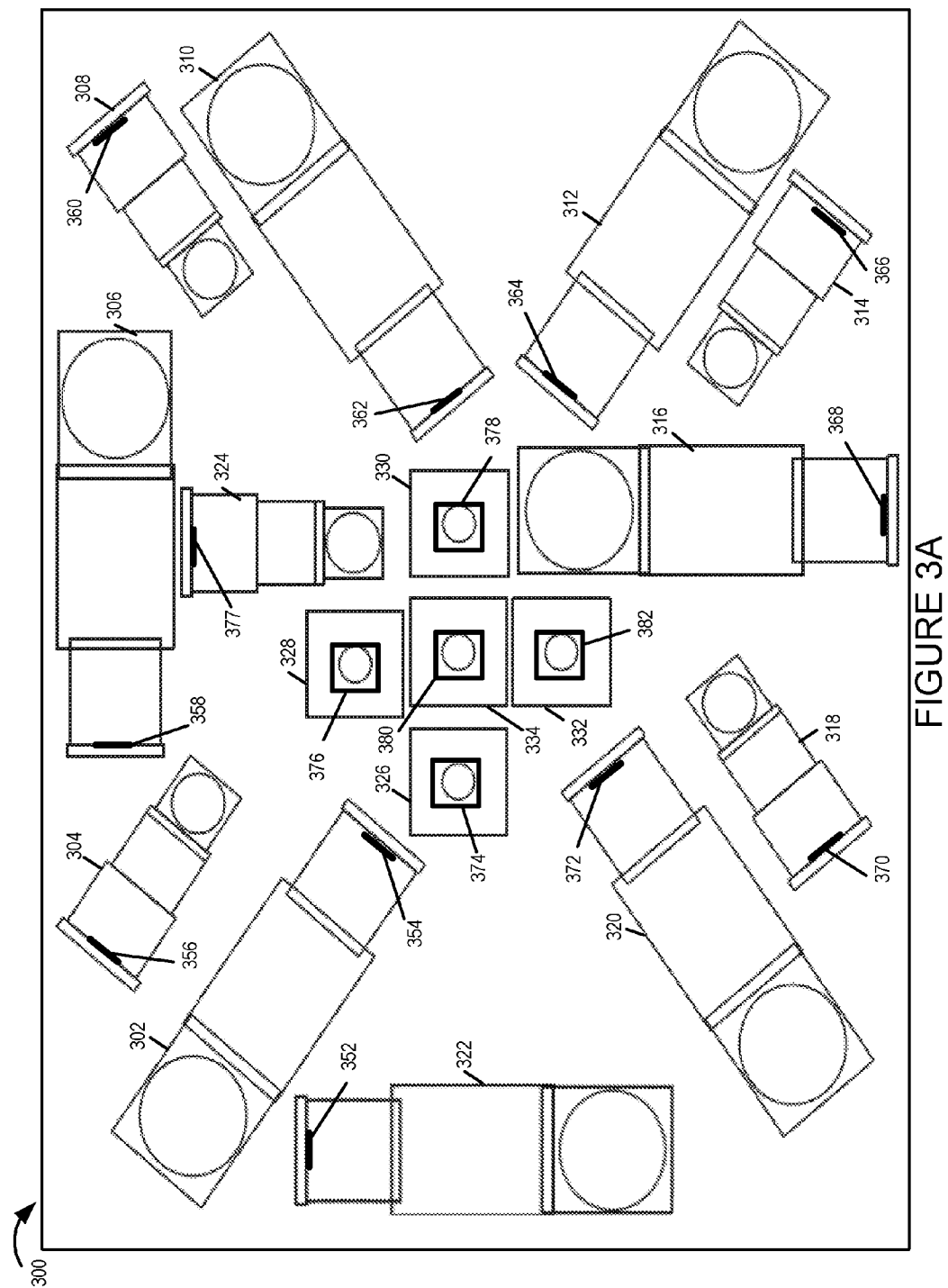
FIG. 3A illustrates an arrangement of optical chains, e.g., camera modules, used in one embodiment to implement a camera device such as the one shown in FIG. 2 in accordance with some embodiments.

FIG. 3A is a diagram 300 showing an arrangement of optical chains, e.g., camera modules, within the body of an exemplary camera device 300. The camera device can be the same or similar to the camera devices 100, 202 shown in FIGS. 1 and 2. It should be appreciated that the camera device will include a number of openings in the face of the camera corresponding to the number of modules in the camera device. Accordingly the circle openings shown in FIG. 2 are to be considered exemplary and the camera device 202 would include openings to match the locations of the outer openings of the camera modules such as those shown in FIG. 3A.

For a variety of reasons, including mounting reasons and/or a desire to be able to support capture of different areas of a scene by moving mirrors oriented differently, it can be desirable to support a variety camera module, e.g., optical chain, mounting orientations.

Figure 3B:
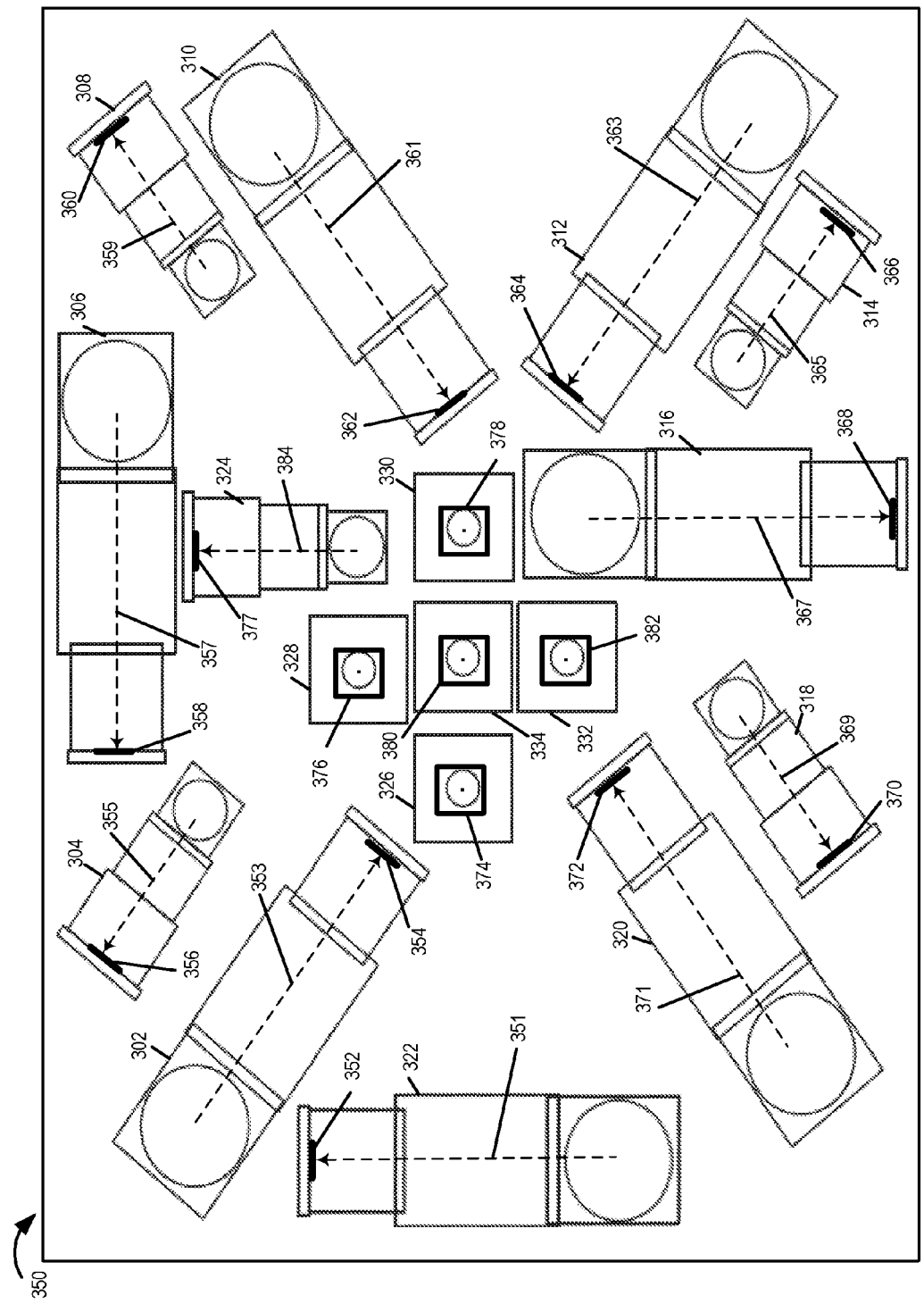
FIG. 3B shows the optical chains of FIG. 3 with the optical axis of the chains shown.

In the illustrated example of FIGS. 3A and 3B there are 17 camera modules arranged in the depicted manner. Camera modules 328, 326, 332, 334, 330 which appear square in shape in FIG. 3 do not include mirrors and have optical chains which face straight out the face of the camera 300. While the camera module 328, 326, 332, 334, 330 face straight out the optical axis of these modules extend in towards the back of the module to the sensor represented by the square surrounding the round aperture of the camera module. For example camera module 328 includes sensor 376, camera module 330 includes sensor 378, camera module 332 includes sensor 382, camera module 334 includes sensor 380 and camera module 326 includes sensor 374. The sensor mounting board of such optical chains is mounted in the same plane and with the same general orientation as the back of the camera device. The sensors of modules 328, 326, 332, 334, 330 are not rotated relative to the sensor mounting boards on which they are mounted and the back or front of these modules is secured to a module mounting surface which extends parallel to the face of the camera.

The other optical chains such as optical chains 302, 320, 322, 304, etc. include mirrors. Such modules have sensor mounting boards which extend in the Z dimension. Thus while the sensor mounting board of camera module 328 which does not include a mirror extends left to right and top to bottom in the camera device 300, the sensor mounting board of camera module 302 will extend from the back to front of the camera and along a diagonal as viewed from front of the camera. Modules with mirrors will receive light through the front of the camera and then redirect the light within the body of the camera device towards the sensor of the module. Thus light entering a module with a mirror will be directed sideways, e.g., on a diagonal, towards the top or bottom of the camera device, or sideways and towards one of the top and bottom portions of the camera device before hitting the optical sensor of the module onto which the light is directed by the module's mirror. Thus the mirrors allow a portion of the optical axis to extend at a right angle or another angle with respect to the face of the camera before hitting the corresponding sensor.

Optical sensors are illustrated as dark lines in front of the sensor mounting board of the camera modules with mirrors shown in FIG. 3A. For example, module 306 includes sensor 358, module 308 includes sensor 360, module 310 includes sensor 362, module 312 includes sensor 364, module 314 includes sensor 366, module 316 includes sensor 368, module 318 includes sensor 370, module 320 includes sensor 372, module 322 includes sensor 352, module 302 includes sensor 354, module 304 includes sensor 356 and module 324 includes sensor 377.

The seven optical chains 302, 306, 310, 33, 316 320, 322 have the largest lenses and largest supported focal lengths. Similarly, the five camera modules 304, 308, 314, 318, 324 have the medium diameter lenses and medium supported focal lengths. The five optical chains 326, 328, 330, 332 and 334 having the smallest diameter outer openings, e.g., light entrance openings, and smallest focal lengths are implemented using optical chains which do not use mirrors and extend straight toward the back of the camera. Optical chains which do not include mirror assemblies may be used for the optical chains 326, 328, 330, 332 and 334. From the FIG. 3A example which may be considered as a frontal view with the front of the camera housing removed to allow viewing of the camera modules, it can be seen how a larger number of camera modules can be incorporated into a single camera device allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 202.

FIG. 3B shows the camera modules of FIG. 3A but with the optical axis of the modules shown. In FIG. 3B a dot is used to represent the optical axis of camera modules 328, 330, 332, 326 and 334 which extend through the face of the camera and towards the back of the camera device where the sensor of the modules without mirrors are located. Camera modules with mirrors have optical axis including a first portion which extends through the face of the camera to the mirror of the camera module and a second portion which extends from the mirror to the sensor of the optical axis. While some optical axis of camera modules with mirrors are directed straight up towards the top of the camera device or at an angle towards the top of the camera device shown in FIG. 3B, other camera modules have optical axis directed straight towards the bottom of the camera or at an angle towards the bottom of the camera. For example optical axis 353, 361, 365, 368, 369 extend downward towards the bottom of the camera. Optical axis 355, 359, 363, 371, 351 and 384 extend upward towards the top of the camera device. Given the use of mirrors, a scene area will appear inverted in modules with mirrors having optical axis in one of the upward or downward direction and appear as being non-inverted in the modules with optical axis in the other direction. The arrangement of optical chains with optical axis in a variety of directions can have advantages in terms of mounting as well as control over which portions of a scene are captured as one or more mirrors of optical chains are moved. Thus, while it might seem easier to arrange modules in a uniform manner with all optical axis facing in one direction, there are several different reasons why it maybe and sometimes is desirable to mount camera modules in a non-uniform pattern with optical axis oriented in a variety of directions.

Figure 4:
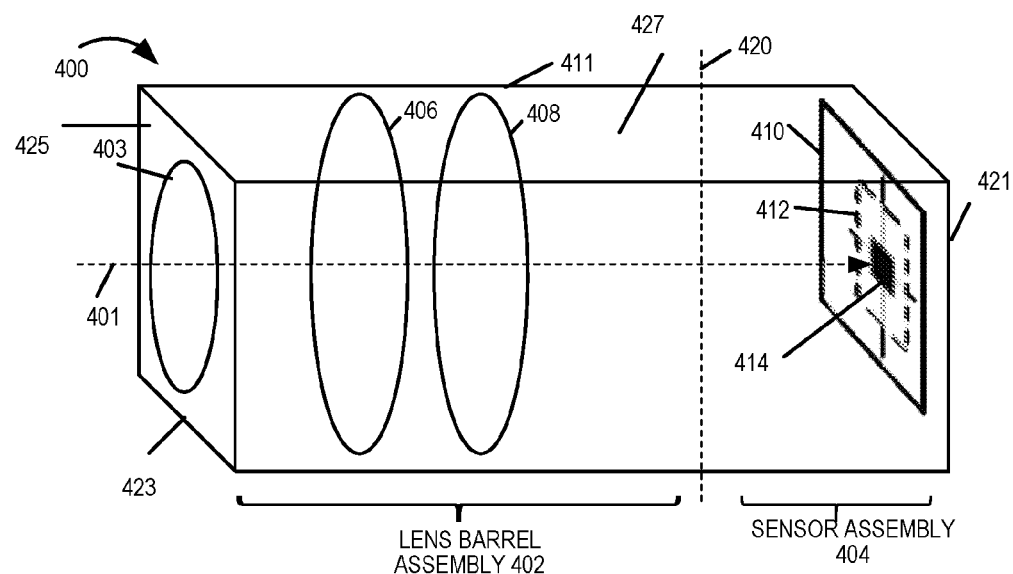
FIG. 4 illustrates an assembly of components used in an exemplary camera module, e.g., optical chain, which is used in a camera device in some embodiments.

FIG. 4 illustrates an assembly 400 of components used in an exemplary camera module, e.g., optical chain, which is used in a camera device in some embodiments. The optical axis 401 extends from the front of the camera module 400 to the back of the module where sensor 412 is located. The assembly 400 may be used as part of at least some of the camera modules shown in FIG. 3, e.g., such as for camera modules 326, 328, 330, 332, 334. The optical chains 326, 328, 330, 332, 334 do not include mirror/mirror assemblies and thus the assembly 400 can simply be used as any one of these camera modules itself. The assembly 400 includes a housing 411, having at least one flat surface suitable for use as a camera module mounting surface. In the FIG. 4 example, the camera module does not include a mirror and the camera module 400 includes a flat front surface and a flat rear surface 421 which are well suited and sued in some embodiments to mount the camera module 400 to a camera module mounting board. The camera module also includes flat sides and a flat top 427 and flat bottom 423. The module 400 also includes a lens barrel assembly 402 and a sensor assembly 404 which maybe and sometimes are included in the hosing 411. The walls of the housing 411 may serve as the walls of the sensor assembly 404. Line 420 illustrates where the lens barrel assembly stops and the sensor assembly 404 starts. The two parts of the assembly 400 i.e., barrel assembly 402 and sensor assembly 404 may be coupled together when used in a camera module as will be discussed. The lens barrel assembly 402 includes an opening 403 via which the light rays pass through, travel along the lens barrel assembly and reach the filter and sensor assembly 404. Reference 401 indicates the optical axis of the camera module where the assembly 400 is used. The lens barrel assembly 402 further includes one or more lenses, e.g., such as the two lenses 406, 408 shown for simplicity, via which the light rays traverse prior to reaching the sensor assembly 404. While not shown in the figure the assembly 400 may also include one or more filters prior to or included within the sensor assembly 404. The sensor assembly 404 includes a sensor mounting board/printed circuit board (PCB) 410, has a sensor area 412, which corresponds to a sensor die, that is aligned along the PCB or flat reference surface, e.g., the base of the sensor mounting board 410. The rectangular area 414 represents the optically active area of the sensor 412. The camera module 400 may be and sometimes is used as one of the camera modules 326, 328, 334, 332, 330 of the camera shown in FIG. 3 with the back 421 of the camera module housing being mounted in a plane parallel to the back of the camera device 300 and with the sensor being positioned parallel to the back of the camera in which the module 400 is located. However, the front 425 of the camera module 400 could instead be mounted to the camera module mounting board, e.g., 202 which serves as the face of the camera or is behind the face of the camera. However, other configurations are possible. An exemplary arrangement and alignment of the optically active image sensing area 414 of the sensor 412 with reference to the PCB 410 or a flat reference surface is illustrated in further detail in FIGS. 5-6. As shown in the figure, the optically active area 414 of the sensor is oriented along the sides of the PCB 410 such that the longer sides of the rectangular sensor area 414 are parallel to the edges of the PCB board on which the sensor is mounted.

Figure 5:
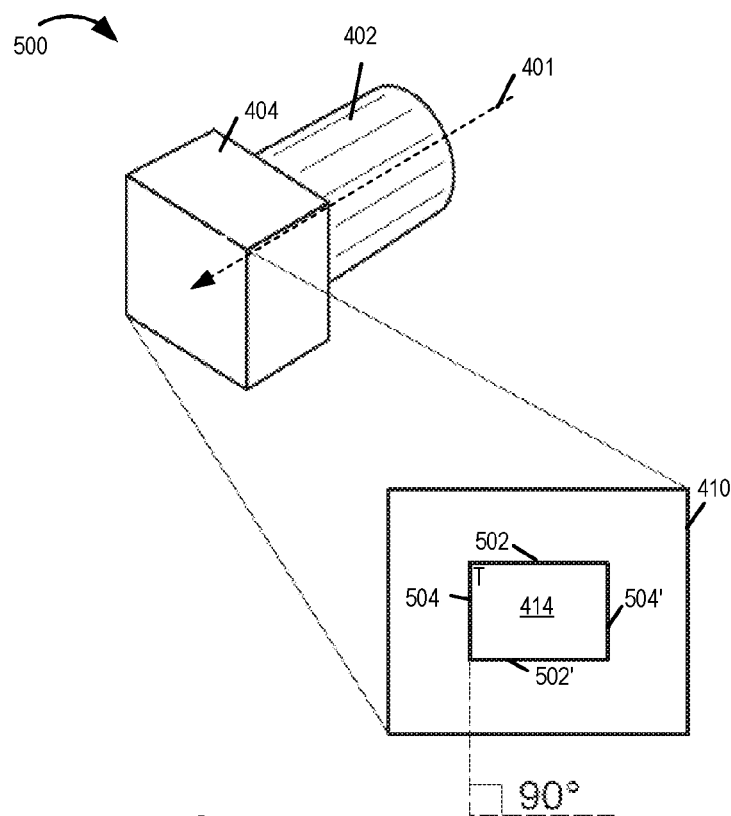
FIG. 5 illustrates a drawing showing a perspective view of the assembly shown in FIG. 4 and a sensor assembly in more detail.

FIG. 5 illustrates a drawing 500 showing a perspective view of the camera module 400 from the outside, e.g., exemplary external view without the full camera module housing 411 being shown. The portion of the camera module housing 411 corresponding to the sensor assembly 404 is shown in FIG. 5 as the rectangular area identified by reference 404 since the sensor assembly is inside this portion of the camera housing 411. The optical axis 401 shows the path of the light which passes through the barrel assembly 402 prior to reaching the sensor assembly 404.

Drawing 500 further shows the alignment of the optically active area 414 of the image sensor relative to the sensor mounting board 410 of the camera module 400. The optically active area of the sensor 414 is a rectangle with two longer sides 502, 502' and two short sides 504, 504'. It can be appreciated from the figure that the optically active area of the sensor 414 is aligned such that the longer sides 502, 502' of the optically active area of the sensor 414 are perpendicular to the base of the mounting board. The sensor 412 has the same orientation as the mounting board on which it is mounted and is not rotated with regard to the bottom of the mounting board.

Figure 6:
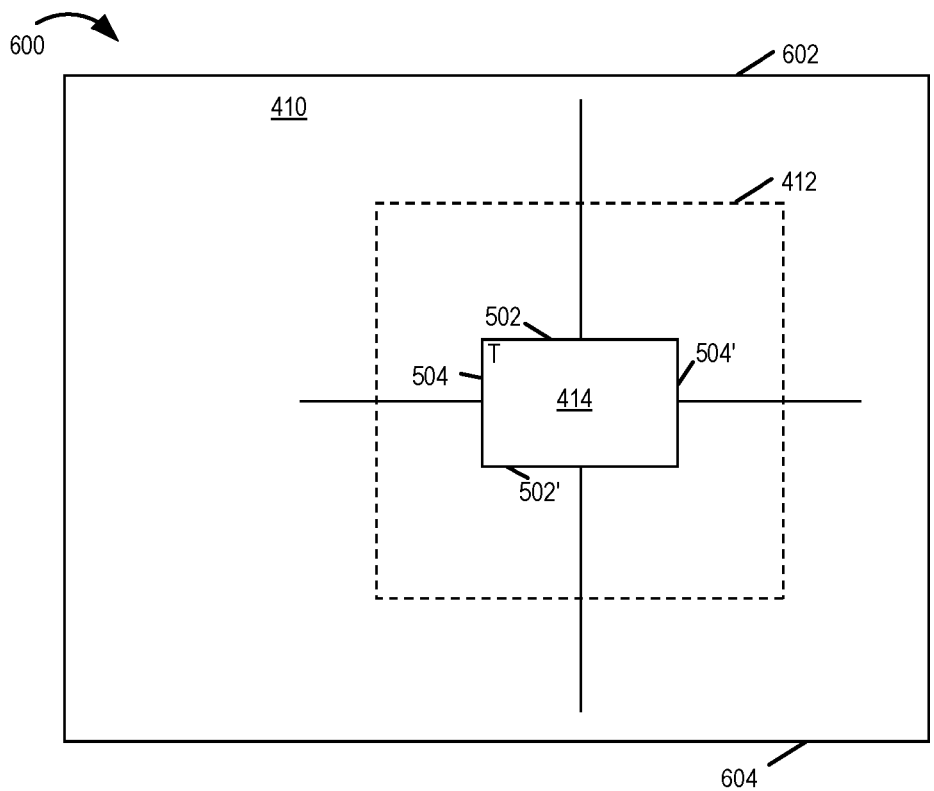
FIG. 6 illustrates a drawing showing the arrangement of an exemplary sensor on a sensor mounting board in greater detail.

FIG. 6 illustrates a drawing 600 showing the arrangement of an exemplary sensor 412 on a sensor mounting board 410 in greater detail. The drawing 600 shows the sensor mounting board 410, the sensor area 412 (sensor die) and the optically active area 414 of the sensor as well as their alignment with respect to each other in more detail. While the sensor 412 is shown as a square, it should be appreciated that the sensor area 412 maybe, and in many cases is, rectangular.

In the FIG. 6 diagram which corresponds to the non-rotated sensor configuration used in module 400, the top and bottom (base) sides of the mounting board are indicated by reference numbers 602 and 604 respectively. As discussed above with regard to FIGS. 4-5, the optically active area 414 of the sensor is oriented along the sides of the PCB 410 such that the longer sides 502, 502' of the optically active portion 414 are parallel to the base 604 of the mounting board 410 on which the sensor is mounted.

While the sensor arrangement shown in FIG. 4 is suitable for camera modules such as modules 326, 328 which have camera modules which are not rotated or arranged on a diagonal relative to the bottom of the camera device 300, such a configuration where the sensor is mounted in a manner that its edges are parallel to the edges of the PC board on which the sensor is mounted may not be suitable for embodiments where the camera modules are mounted on angles relative to the bottom of the camera device.

This is because if the sensor orientation/alignment shown in FIGS. 4-6 is used in camera modules mounted on a diagonal such as camera modules 320, 318, 302, 302 some portion of a scene of interest may be lost, e.g., cut off, in an image captured by these camera modules since these camera modules have a rotational offset as compared to camera modules with sensors that have a bottom edge parallel to the bottom of the camera.

While mounting camera modules on angles such as shown in FIG. 3 has numerous advantages and benefits relating to zooming and other functions, in some embodiments an image captured by at least some of the camera modules with rotational offset may fail to captures portions of a scene of interest due to light from the scene of interest missing the active area of the sensor due to the sensor's rotational offset.

Figure 7:
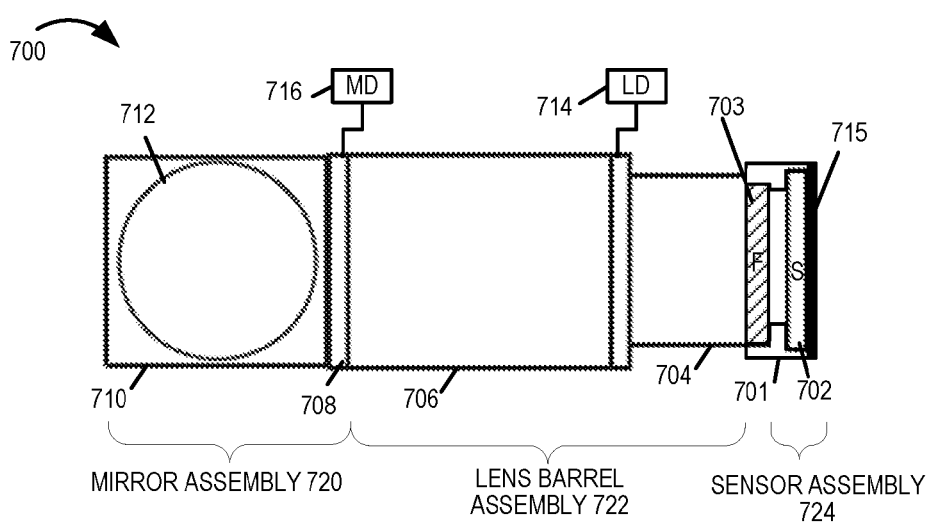
FIG. 7 shows an optical chain, e.g., camera module, which is used in various exemplary embodiments.

FIG. 7 shows an optical chain, e.g., camera module, 700 which is used in various exemplary embodiments. A plurality of optical chains of the type illustrated in FIG. 7 are used in a camera device such as the camera 202. For example the optical chain 700 may be used as any of the camera modules 302, 304, 306, 308, 310, 312, 314, 316, 318, 320, 322 and 324. The camera module 700 is an optical chain that includes an assembly of different elements integrated together to form the camera module. As illustrated, camera module 700 includes a mirror assembly 720, an optical lens assembly 722 (also referred to as lens barrel assembly since it may include multiple lens included in a moveable lens barrel) and a sensor assembly 724. The mirror assembly 720 of the camera module 700 includes an outer opening 712 which maybe covered by a flat glass/plastic plate, a light redirection device, e.g., mirror, 710 positioned behind the opening 712, and a mirror hinge 708. The mirror hinge 708 is coupled to the mirror drive (MD) 716. The optical elements assembly 722 of the camera module 700 includes a first cylindrical module portion 706 and a second cylindrical module portion 704, with the optical elements assembly 722 being coupled to a lens drive 714. The sensor assembly 724 of the camera module 500 is preceded by or include as part of the assembly 724, a filter 703 mounted on a filter mount 701. The sensor assembly 724 further includes a sensor 702 placed on a sensor mounting board 715. The sensor mounting board maybe and sometimes is a printed circuit board with electrical connections and/or a flex tape which can be used to connect the sensor mounted on the board to the processor of the camera device in which the camera module 700 is mounted. Camera module 700 maybe used as any one of the camera modules of FIG. 3 which include a mirror. Light enters the optical chain 700 via the opening 712 and is redirected by the mirror 710 so that it reaches the sensor 702 at the back of the optical chain. The first and second cylindrical portions 704, 706 can house one or more lenses and in some cases filters as well as other optical components through which light may pass before reaching the sensor 702. While the mirror 710 is normally used to redirect light 90 degrees or approximately 90 degrees so that light entering through the opening 712 (which may be positioned on the face of the camera) along it's optical axis will be redirected along the optical axis of the optical chain 700 so that is travels towards the side of the camera allowing for the optical chain 700 to effectively use the side to side distance of the camera device in which the optical chain 700 is mounted, the mirror drive 716 may move the position of the hinge 708 and thus the mirror 710 to alter the angle of redirection so that it varies from 90 degrees. Thus, the direction in which the optical chain 700 effectively points may be altered by moving all or a portion of the hinge 708 and mirror 710. In some embodiments, the opening 712 is covered with a plane piece of glass with no optical power which as noted above maybe referred to as an outer lens even though it has little or no optical power. The MD 716 may be implemented using a motor or other mechanical mechanisms which can be used to drive or change the position of the mirror 710 and/or hinge 708 which connects the mirror to the other components of the camera module such as cylindrical portion 706. The cylindrical or barrel portions 704, 706 of the optical elements assembly 722 may be moved by lens drive 714 so that they slide relative to each other, e.g., barrel portion 704 may be moved so that it moves further into or out of the barrel portion 706 thereby altering the distance from the opening 712 to the sensor 702 as part of a focus or zoom operation. It should be appreciated that the optical chain 700 allows for relatively long optical chains to be positioned in a camera device which has a depth which is less than the overall length of the optical chain 700. The camera module 700 is particular well suited for implementing camera devices which include multiple optical chains but which are still intended to be relatively thin to facilitate storage in a pocket or other storage device.

Figure 8:
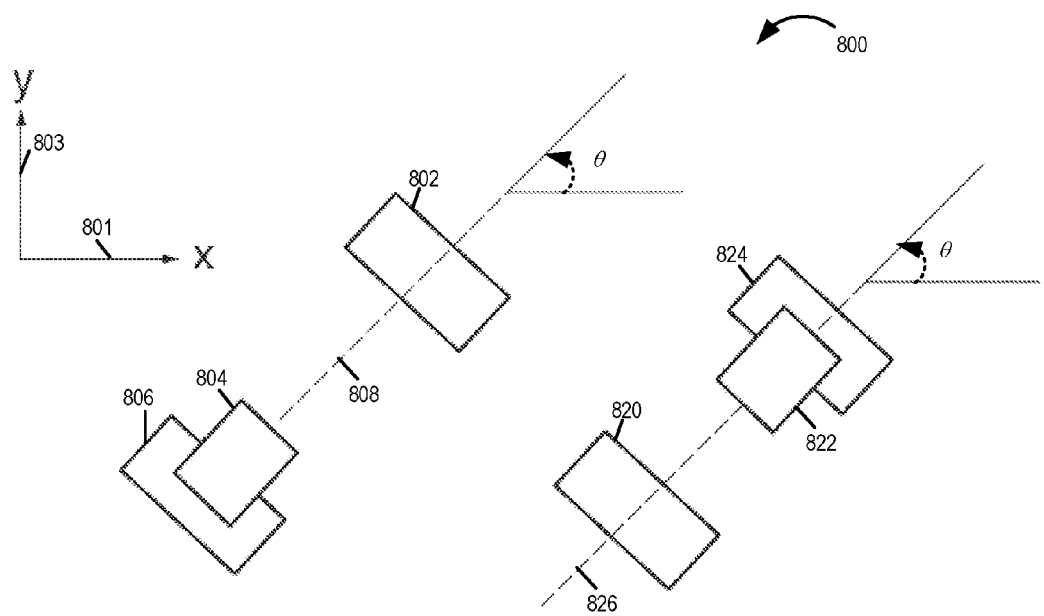
FIG. 8 is a drawing illustrating the arrangement of two exemplary camera modules in an exemplary camera device.

FIG. 8 is a drawing 800 illustrating the arrangement of two different exemplary camera modules in the exemplary camera device 202 in an X-Y plane. The first camera module includes and/or corresponds to a mirror assembly 802, lens barrel assembly 806 and sensor assembly 806 with the line 808 indicating the optical axis of the first camera module. The second camera module includes and/or corresponds to a mirror assembly 820, lens barrel assembly 822 and sensor assembly 824 with the line 826 indicating the optical axis of the second camera module. The lens barrel housing is not shown in FIG. 8 but each of the first and second camera modules would also have a housing including a flat mounting surface which would correspond to the bottom or top of the sensor assemblies 806, 824 with the bottom being used as the mounting surface if the camera modules were mounted to a board at the back of the camera and the top being used as the mounting surface in some embodiments if the camera modules were mounted to a mounting board located on the front side of the camera. The first camera module may correspond to, for example, camera modules 310 or 318 of FIG. 3 and the second camera module may correspond to, for example, camera modules 320 or 308 of FIG. 3. The angle (θ) of the optical axes of the first and second camera modules with respect to the X-axis 801 (X axis 801 and Y axis 803 is shown to facilitate an understanding of the orientation of the camera modules.

FIG. 9 illustrates an assembly 900 of components used in an exemplary camera module, e.g., optical chain, which is used in a camera device in some embodiments can include a sensor which is rotated relative to a printed circuit board 914 on which the sensor is mounted and also relative to the bottom surface/base 973 and/or top flat mounting surface 925 of the camera module. The bottom surface/base 973 and/or top flat mounting surface 925 of the camera module will often correspond to the top and bottom of the printed circuit board on which the sensor is mounted. The assembly shown in FIG. 9 and in some embodiment is used as components of the camera module shown in FIG. 7 with the lens barrel assembly 902 being used in place of the lens barely assembly 702 and with the sensor assembly 904 being used in place of the sensor assembly 704. Thus in some embodiments a camera module is implemented with a mirror assembly 720 preceding the lens barrel assembly 902 and sensor assembly 904.

Thus it should be appreciated that FIG. 9 does not show the mirror portion of the camera module for simplicity but it should be appreciated that when a module includes a mirror, the mirror would be in addition to the components shown in FIG. 9. For example mirror 802 or 820 would be included as part of the camera module in addition to the lens barrel assembly 902 and sensor assembly 904.

The assembly 900 may be used as part of at least some of the camera modules shown in FIG. 3, e.g., such as camera modules 302, 304, 308, 310, 312, 314, 318, and 320. The assembly 900 includes a lens barrel assembly 902 part and a sensor assembly 404 part which are shown separated by line 920 in the figure. The two parts of the assembly 900 i.e., barrel assembly 902 and sensor assembly 904 may be coupled together when used in a camera module as shown and discussed with regard to camera module 700 of FIG. 7. The lens barrel assembly 902 includes an opening 903 via which the light rays pass through, travel along the lens barrel assembly and reach the filter and sensor assembly 904. Reference 901 indicates the optical axis of the camera module where the assembly 900 is used. The lens barrel assembly 902 further includes one or more lenses, e.g., such as the two lenses 906, 908 shown for simplicity, via which the light rays traverse prior to reaching the sensor assembly 904. While not shown in the figure the assembly 900 may also include one or more filters prior to or included within the sensor assembly 904. The sensor assembly 904 includes a sensor mounting board/printed circuit board (PCB) 910, has a sensor area 912, which corresponds to a sensor die, that is aligned along the PCB or flat reference surface, e.g., the base of the sensor mounting board 910. The rectangular area 914 represents the optically active area of the sensor 912. An exemplary arrangement and alignment of the optically active image sensing area 914 of the sensor 912 with reference to the base of the sensor mounting board 910 is shown (and illustrated in further more detail in FIGS. 10-11). As shown in FIG. 9, the optically active area 914 of the sensor is oriented at an angle with respect to the base of sensor mounting board 910. Such an exemplary configuration of the camera module with the sensor optically active area 914 being rotated at an angle with respect to the base of the sensor mounting board 910 allows for improved image capture of a scene area of interest without loosing portions of the scene area of interest while still allowing the camera module to be mounted using the flat surface of the camera module housing.

The rotated sensor arrangement such as illustrated in FIG. 9, is done in accordance with the features of present invention, in such a way as to counteract or avoid the rotational offsets that would otherwise be introduced into a capture image by anticipating the offset that will occur when the camera module is installed on a mounting board in a camera case and used to capture an image, e.g., at the same time other modules capture an image of the scene area. The rotational offset of the sensor within the camera module compensates for the rotation offset which will be introduced during image capture a priori as a result of the rotated sensor design thereby reducing or avoiding the need to compensate for such an offset after image capture, e.g., at the time a composite image is to be generated from images captured by different modules of the same camera.

Thus while it might be possible to computationally compensate for rotational offset introduced due to camera module orientation in the camera if the sensor board was not rotated and the full image area of interest was captured, the need to computationally correct for such image rotation is avoided and images captured by different camera modules, including camera modules rotated at an angle relative to the bottom of the camera device can be easily combined without computational offsetting an image rotation which would be present absent the use of a rotated sensor.

FIG. 10 is a drawing 1000 illustrating the alignment of the optically active area 914 of the image sensor relative to the sensor mounting board 910 in more detail. The optically active area of the sensor 914 is a rectangle with two longer sides 1002, 1002' and two short sides 1004, 1004'. The top side and bottom (base) side of the mounting board 910 indicated by reference numbers 1010 and 1010' respectively. It can be appreciated from the figure that the optically active area of the sensor 914 is aligned such that the longer sides 1002, 1002' of the optically active area of the sensor 914 are at an angle of "θ" with respect to the side 1012 of the mounting board 910 while at an angle of "90°-θ" with respect to the base 1010' of the mounting board 910 and base 1020 of the optical chain in which the sensor board 910 is mounted.

FIG. 11 illustrates a drawing 1100 showing the arrangement of an exemplary sensor 914 on the sensor mounting board 910 in one exemplary embodiment for a specific value of the angle "θ" used in some embodiments. In the illustrated embodiment the angle "θ=36.87°". As shown in the figure, in such a case the diagonal 1102 of the rectangular optically active area of sensor 914 is perpendicular to the base 1010' of the mounting board 910.

In order to allow for a thin camera implementation it may be desirable to use a mirror positioned towards the front of a camera module to redirect light and allow at least a portion of a camera module/optical chain to be oriented so that space between the left and right sides of a camera can be used for a portion of the optical chain. The use of a mirror results in what is sometimes referred to as a folded system. A combination of optical chains some with mirror and others without may result in a useful and desirable configuration for a multi-module camera device where multiple optical chains may be present and used in a single camera device. In such an embodiment, it is often desirable that images captured by different optical chains, e.g., camera modules, be readily combined.

In an imaging system such as a multi-camera, folded system, the images captured by some of the camera modules may have some rotation with respect to another camera module, or some reference scene. This may be due to module positioning within the camera device, mirror orientation issues within particular camera modules and/or due to other reasons. There may also be other additional reasons for such a rotation in the image such as miss-alignment between components during assembly and/or physical mounting issues due to space constraints associated with incorporating multiple camera modules and/or components in a single camera device.

In accordance with the invention, in such cases rotating the sensor of one or more camera modules relative to the camera module body as discussed with regard to FIGS. 9-11, printed circuit board on which the sensor is mounted, can in at least some cases support better capture of the scene of interest by the camera modules including the sensor mounted in what may be considered a rotated position relative to the base of the sensor mounting board.

It should be appreciated that if a sensor corresponding to a camera with a rotationally offset field of view relative to other camera modules were not rotated, the rotationally offset camera sensor would capture a rotated image where some relevant regions of a reference scene/reference camera might be lost due to the offset thereby reducing the usefulness of the captured image for purposes of combining with images captured by other camera modules of the camera.

Thus in accordance with one aspect of some embodiments the optically active area of a sensor, e.g., sensor area 914, of one or more camera modules, of a multi-camera module camera, is rotated at an angle, e.g., theta, cameras discussed above. This rotation compensates for the rotational offset which will occur during image capture. In some embodiments the PCB layout and schematic are accordingly designed with this rotation angle theta in mind where theta is determine on a per module, e.g., optical chain basis. In some embodiments the sensor of an optical chain is placed, bonded and/or mounted within a optical chain housing at this orientation prior to mounting of the optical chain in the body of a camera or on a board of the camera.

Figure 12:
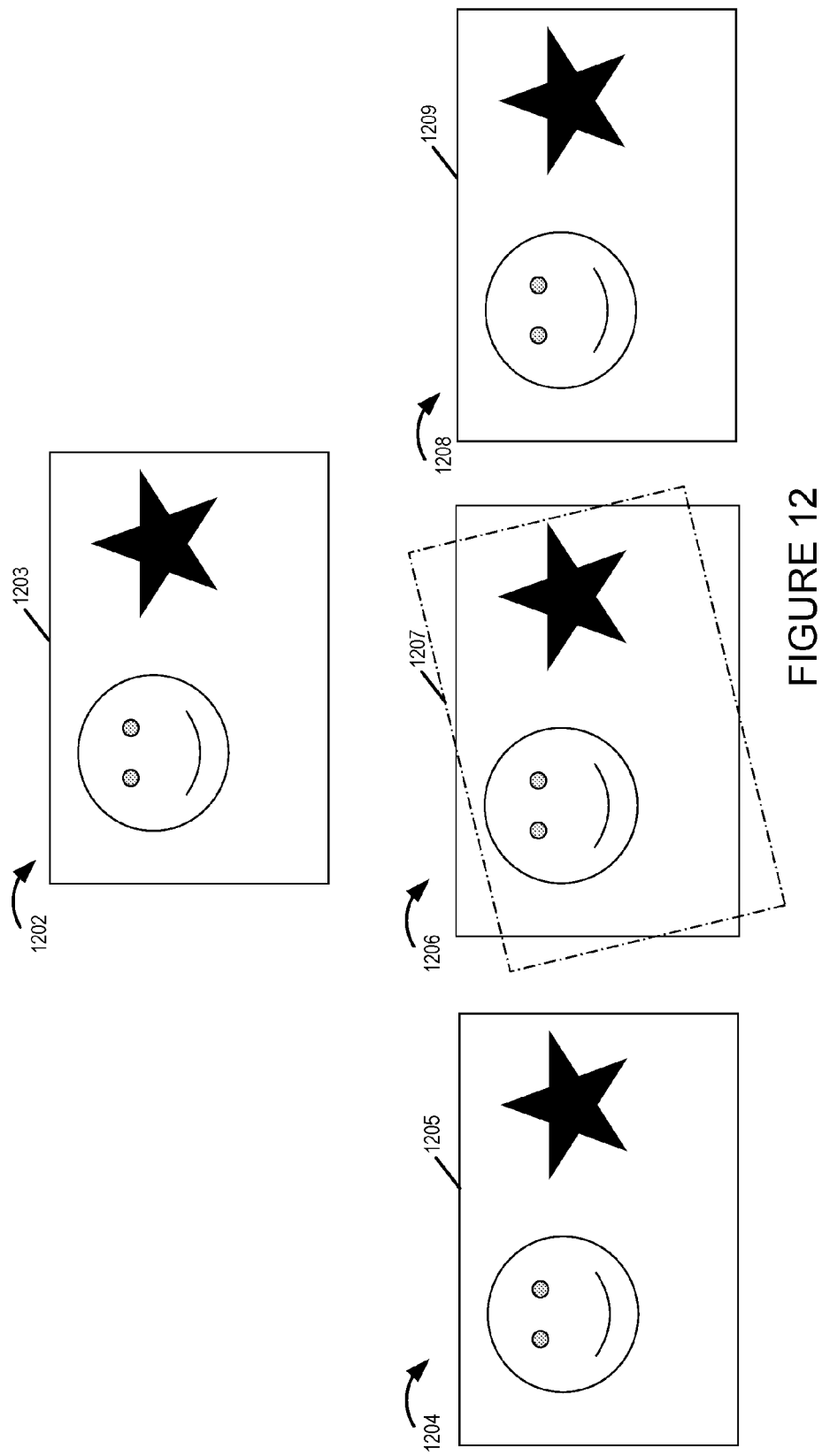
FIG. 12 includes various drawings to facilitate an understanding of the invention.

FIG. 12 includes various drawings to facilitate an understanding of the invention including a drawing 1202 showing a reference scene of interest 1203 which is captured using the multi-camera system of FIG. 3. The drawing 1204 includes an image 1205 of the reference scene of interest 1203 which is an exemplary image captured by a reference camera module such as the forward facing camera module 326, 328, 330, 332 or 334. The drawing 1206 shows an image 1207, illustrated using dashed lines, of the portion of the reference scene 1203 which would be captured by a camera module with a rotational offset if the offset was not compensated for by a corresponding sensor rotation thus showing a case where image capture is performed by one of the camera modules such as camera modules 302, 304, 308, 310, 312, 314, 318, and 320 but without using the rotated sensor configuration shown in FIGS. 9 and 10. It can be appreciated from image 1205 and 1207 (dashed lines) that when the rotational offset is not compensated the captured image 1207 looses a portion, e.g., portion outside the dashed line box, of the scene of interest 1203. Thus it can be appreciated that the image area 1207 looses portions of interest in the scene when compared to the reference image 1205 since portion of the scene area of interest 1203 fall outside the image capture area indicated by the dashed lines. Drawing 1208 shows an image 1209 captured by an exemplary camera module, such as any of the camera modules 302, 304, 308, 310, 312, 314, 318, and 320, that uses a rotated sensor in accordance with the invention. Thus, despite the different mounting arrangement, use of a mirror and rotational offset introduced by the camera module, the reference camera module, e.g., 326, and the rotated camera module, e.g. 302, with the offset compensated sensor alignment both modules will capture the same scene area of interest due the intentional rotation of the sensor in module 302 relative to the sensor mounting board used in the camera module 302.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use a circuit or circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. In some embodiments modules are implemented as logic in a process with different logic being used for each module. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

In some embodiments the processor of a camera is configured to control the camera to implemented the method in accordance with the invention.

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

In one exemplary embodiment a camera device includes a first optical chain including a first sensor with a first rectangular image sensing area including a first edge, the first sensor being at least i) mounted on a first printed circuit board with the first edge being rotated at a first angle relative to a first edge of the first printed circuit board or ii) mounted in a first camera module housing with the first edge being rotated at an angle relative to a flat mounting surface of a first camera module housing. In one embodiment of such a camera device the first sensor is mounted in the camera housing and wherein said first edge is a straight edge of the first sensor which is mounted at a non-zero angle relative to the flat mounting surface of said housing. The flat mounting surface of said housing is a top or bottom surface of said first optical chain, said mounting surface being secured to a camera module mounting board in said camera on which at least one other camera module is mounted in some embodiments. In some embodiments the flat mounting surface is mounted in a camera case with the flat mounting surface being secured to a mounting board which extends in a camera case in a plane that is parallel or generally parallel to the back of the camera case. The mounting board maybe and sometimes is a plate to which multiple camera modules are secured which is positioned behind and parallel to the front surface of the camera device.

In some embodiments the first sensor is mounted on a printed circuit board with different camera modules having different circuit boards on which sensors are mounted. In some embodiments the camera device is a single camera module which maybe incorporated into another device. In some embodiments the first optical chain includes a mirror.

In some embodiments the first angle is a non-zero angle less than 90 degrees. In some embodiments the camera device includes multiple optical chains some with mirrors and some with out. In one embodiment the camera device includes at least one additional optical chain which does not include a mirror, said additional optical chain including an additional rectangular sensor with a bottom portion of said additional rectangular sensor extending parallel to the bottom of said camera case. In some embodiments the additional optical chain faces straight out through the face of the camera device and the sensor of the additional optical chain is mounted perpendicular to the sensor of the first optical chain.

In some embodiments the camera device which includes the first optical chain includes a second optical chain including a second sensor with a second rectangular image sensing area rotated at a second angle with respect to the bottom of a second printed circuit board on which the second sensor is mounted, said second angle being different from a first angle at which the first sensor is mounted with respect to said first edge, said first edge being a bottom edge of the first printed circuit board.

In at least some embodiments the camera device includes a camera case including a bottom and the first optical chain includes a mirror with the first optical chain having an optical axis a portion of which is at a non-zero angle relative to the bottom of the camera case; and wherein the camera device further includes a second optical chain which does not include a mirror and which has a second sensor with a bottom edge mounted parallel to the bottom of the camera case. In one such embodiment the camera device further includes a processor configured to generate a composite image by combining a first image of a scene area captured by the first optical chain and a second image of the scene area captured by the second optical chain without performing an image rotation operation on either the first or second images.

Various embodiments are directed to a method of operating a camera device such as the one shown in FIG. 3.

Figure 13:
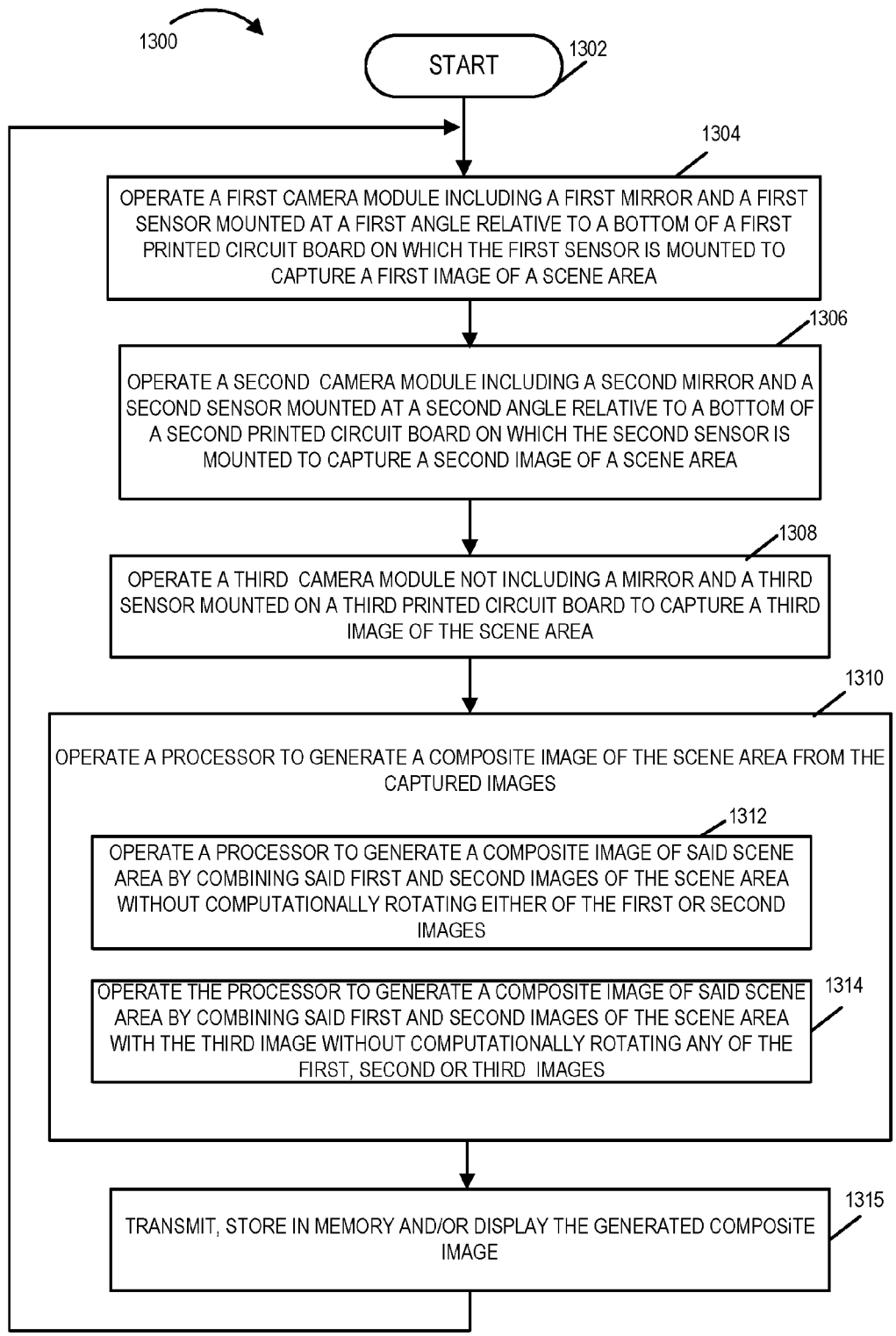
FIG. 13 illustrates an exemplary method of the present invention.

FIG. 13 illustrates the steps of one exemplary method of operating a camera device. The method starts in step 1302 where the processor of the camera device, e.g., camera device 100200 or 300 controls the camera device to implement the method. In step 1304 the processor operates a first camera module, e.g., camera module 310 of camera 300, including a first mirror and a first sensor mounted at a first angle relative to a bottom of a first printed circuit board on which the first sensor is mounted to capture a first image of a scene area. Then in step 1306 the processor operates a second camera module, e.g., module 302, including a second mirror and a sensor mounted at a second angle relative to a bottom of a second printed circuit board on which the second sensor is mounted to capture a second image of the scene area, said second angle being different from said first angle. Then in step 1308 the processor operates a third camera module, e.g., camera module 326 which does not include a mirror to capture a third image of the scene area. In step 1310, under control logic and/or a control routine included in the camera 300, the processor is operated to generate a composite image from the captured images. In step 1312 the processor combines said first and second images to generate a composite image of said scene area without performing a computational rotation operation on either of said first and second images. In embodiments where the third camera module is used to capture a third image of the scene area step 1310 includes step 1314 in which the processor combines said first and second images to generate a composite image of said scene area further includes combining said first and second images with said third image with without performing a computational rotation operation on any of said first, second and third images. Operation proceeds in some embodiments from step 1310 to step 1315 in which the generated composite images is transmitted, stored in memory and/or displayed on the display device of the camera or another display device.

Operation proceeds from step 1315 back to step 1304 where additional images of the scene area, e.g., at a later time, maybe captured for processing in accordance with the method. Thus the return arrow in used to indicate that additional images maybe captured and combined at different times. e.g., based on user input that triggers the image capture and/or method 1300 to be implemented. While the method is explained with regard to 3 camera modules 5, 7 10 or all the camera modules of the camera 300 can and in some embodiments are operated in parallel to capture images and the images are then combined, e.g., in step 1310, to generate a composite image without the need or implementation of a computational rotation of any of the captured images as part of the combining process.

FIG. 14 illustrates a scene area 1400 including an individual 1402. Multiple modules in the camera device 202 can capture an image of the scene area 1400. In various embodiments the camera modules are implemented using rolling shutter sensors. The individual 1402 may move over time. Since rolling shutter sensors capture different portions of the scene area 1400 at different times, it is desirable that different camera modules capture the same portion of the scene area at the same time or closely in time so that differences between images captured by different camera modules due to motion of the individual 1402 are minimized. As should be appreciated reducing or minimizing differences between images of the scene area 1400 due to motion of the individual 1402 facilitates image combining since differences between images due to motion are reduced as compared to a case where sensors capture and readout portions of the scene area 1400 at very different times.

Many rolling shutter sensors are controllable in terms of the order in which lines of an image are exposed and read out of the sensor. One, several or all of the sensors of the camera device 202 can be controlled to expose and read out lines in one of two different orders, e.g., in a first order or in a second order.

Figure 15B:
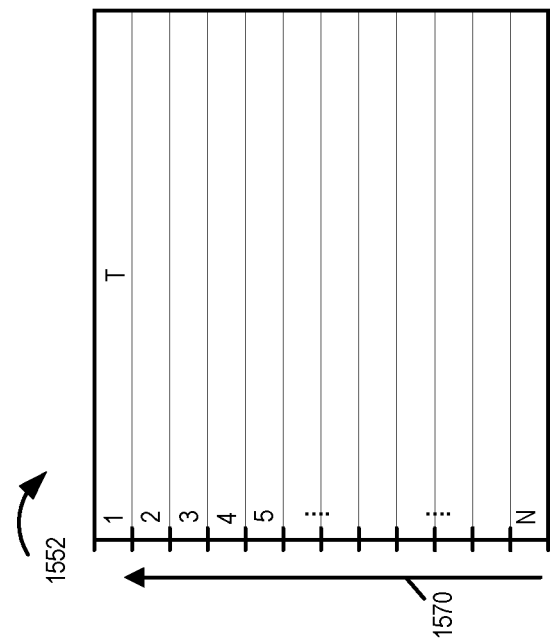
FIG. 15B illustrates a second read out order which maybe used to control reading out of a sensor using a rolling shutter.
Figure 15A:
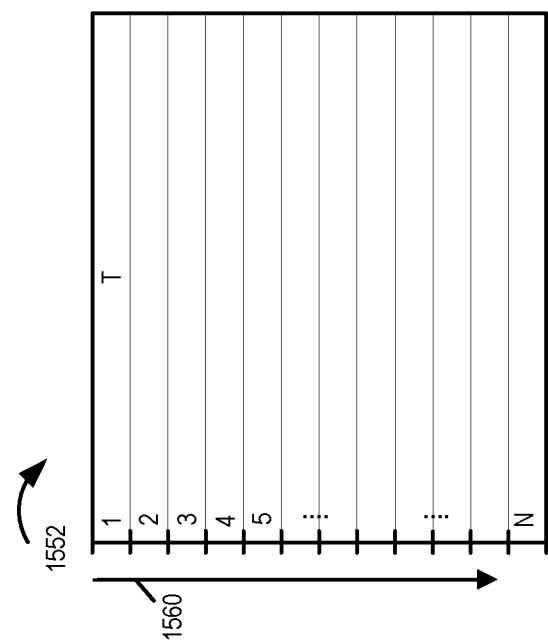
FIG. 15A illustrates a first read out order which may be used to control reading out of a sensor which uses a rolling shutter.

For example, as shown in FIG. 15A which shows the lines 1552 of a sensor a first readout order represented by arrow 1560 can be supported. In FIGS. 15A, 15B, 16A, 16B, and 17 a T is used in the figures to show the physical top of the sensor. It should be appreciated that the T is not part of the scene area or captured image.

In the exemplary case, when the first order readout is used, lines are read out sequentially from the physical top of the sensor sequentially towards the bottom of the sensor as represented by arrow 1560 of FIG. 15A. Each line, identified with one of the numbers 1 through N, corresponds to a plurality of pixel elements. Each pixel element of a line, when exposed, generates a pixel value which can be read out from the sensor. The values read out from a line of the sensor produce a line of an image. In the case where the first order is used to control sensor readout, line 1 of the sensor will be read out before line N.

In the case of a sensor which captures the top of a scene area at the top of the sensor, such as sensor 368 of camera module 316, using the first readout order will result in the top of the scene area being captured and readout before the bottom of the scene area 1400. However, in the case of an inverted camera module that captures the bottom of a scene area at the top of the sensor in the module, such as sensor 352 of camera module 322, using the first readout order will result in the bottom of the scene area being captured and readout before the top of the scene area 1400. Thus it should be appreciated that using the same readout order for all camera modules in the camera device 300 which are operated to capture an image of the scene 1400 at the same time will result in different camera modules capturing the scene area at different times if modules having the same physical construction, including sensor orientation to the mounting surface of the camera module, are mounted in the camera device in both a non-inverted and an inverted position.

As an alternative to the read out order shown in shown FIG. 15A, a sensor can be controlled to readout in accordance with the second readout order shown in FIG. 15B which shows the lines 1552 of the sensor. The second readout order represented by arrow 1570, that be used an alternative to the first order, proceeds from the bottom of the sensor towards the top of the sensor. Thus, in the case of the second readout order is used, lines are read from the physical bottom of a sensor sequentially towards the top of the sensor. Thus line N will be read before sensor line 1 in such a case.

In accordance with various features of the invention, the ability to control at least some sensors to capture images and readout lines in accordance with the second order, while one or more other modules capture and readout an image in accordance with the first readout order, is used to reduce or minimize the time difference between the capture of portions of a scene by sensors of different camera modules, while still allowing camera modules of the same type and construction to be used in an inverted and non-inverted position within the camera device.

The control of the readout order used for different camera modules can be understood with regard to FIGS. 16A, 16B and 17.

FIG. 16A shows an image 1500 of the scene 1400 captured by an optical chain, e.g., module 316, having an optical axis portion 367 extending from a mirror inside the module onto a sensor 368 located towards the bottom of the camera device 202. The module 316 shown in FIG. 16A will be referred to as a non-inverted module since it captures an image of the scene area with the top of the scene being captured at the top of the sensor 368 as represented by the man's head being near the top of the sensor 368 as indicated by the T in line 1 of FIG. 16A. In one embodiment optical chains with mirrors and optical paths which direct light towards the bottom of the camera device 202 are controlled to read out in a accordance with a first read out direction, e.g., a top of sensor to bottom of sensor direction as represented by arrow 1502.

FIG. 16B shows an image 1600 of the scene 1400 captured by an optical chain, e.g., module 322, having an optical axis portion 351 extending from a mirror inside the module 351 onto a sensor 352 located towards the top of the camera device 202. The module 322 shown in FIG. 16B will be referred to as an inverted module since it captures an image of the scene area with the top of the scene being captured at the bottom of the sensor 352 as represented by the man's head being near the bottom of the sensor 352 and thus image. Note that because the module 322 of FIG. 16B is inverted, the top of the sensor will capture the bottom of scene area 1400 while the bottom of the sensor 352 captures the top of the scene area 1400. In one embodiment optical chains with mirrors and optical paths which direct light towards the top of the camera device 202 are controlled to read out in a accordance with the second read out direction also referred to sometimes as a second readout order. In the example, the second order results in a readout from the bottom of sensor 352 to the top of sensor 352 as represented by arrow 1602.

FIG. 17 shows how an image 1700 of the scene area 1400 captured by a module 334 without a mirror and having an optical axis 335 facing in toward the back of the camera extending towards the sensor 380 would appear. Note that in the image 1700 the image appears in a non-inverted position with the top of the scene area 1400 being captured by the top of the sensor 380. Thus in accordance with one embodiment sensor 380 is controlled to readout in accordance with the first direction.

By controlling the optical chains of camera device 202 to capture images and read our in accordance with the readout directions shown in FIGS. 16A, 16B and 17 it should be appreciated that the same portions of the scene area will be captured at the same time or at a time more closely synchronized than would be the case if all the modules read out lines under rolling shutter control in the first direction.

In at least some embodiments readout order information indicating the readout order to be used with individual optical chains, e.g., modules, is stored in memory and used to control the order in which lines are exposed and read out by a sensor included in the module to which the order information corresponds. The readout order information is based, in at least some embodiments, on the orientation of the camera modules and thus optical axis of the camera modules. In some, but not necessarily all, embodiments optical chains which include a mirror and optical axis which extends from the mirror towards the bottom of the camera device are controlled to readout in a first order, e.g., a top to bottom sensor readout order. Camera modules which includes a mirror and optical axis which extends from the mirror towards the top of the camera device are controlled to readout in a second order, e.g., bottom to top sensor readout order. Camera modules without a mirror and an optical axis extending from the front face of the camera device 202 towards the back of the camera device are controlled in one embodiment to read out in the first order. Camera modules with optical axis extending from one side to the other side of the camera, such as camera module 306, can be controlled to read out in either the first or second order but in one embodiment are controlled to read out in the first order.

FIG. 19 shows a table 1900 of exemplary camera module, e.g., optical chain, control information. The information can be accessed by a camera device controller, e.g., a rolling shutter controller, which controls the order in which the sensors of different camera modules may be read out. Based on the information in table 1900, the camera device controller sends a signal to each camera module to configure the sensor to read out in the order indicated in the table 1900.

In table 1900 the first column 1902 includes an optical chain identifier, one per row. The second column 1904 indicates which of the first and second readout orders are to be used with the optical chain identified in the row in which the corresponding readout order information is included. The third column 1906 indicates whether the optical chain to which the row corresponds includes a mirror or not. The mirror information is optional but can be used by the controller in determining various possible camera module control options including for example if mirror movement is supported for zoom operations.

Each row 1910, 1912, 1914, 1916, 1918, 1920, 1922, 1924, 1926, 1928, 1930, 1932, 1934, 1936, 1938, 1940, 1942 provides read out order information for the sensor identified in the row. For example, row 1910 corresponds to optical chain module 302 and the read out order to be used to control the module is the first readout order, e.g., a top to bottom readout order, with column 1906 indicating that module 302 includes a mirror. The second row 1912 corresponds to optical chain module 304 and indicates the second readout order is to be used with optical chain module 304 and that optical chain module 304 includes a mirror. The third row 1914 corresponds to optical chain 306 and indicates that the first readout order is to be used for optical chain 306 which is indicated to include a mirror.

The other rows provide similar information for other modules. For example row 1934 corresponds to optical chain 326 which is to be readout using the first readout order and which does not include a mirror.

The table 1900 is exemplary and the information indicating the order in which individual modules are to read out may be stored in memory in a variety of ways. Accordingly, use of a table is not critical to storing information indicating what readout order should be used for different camera modules but is one example of a convenient way of storing such information. The table maybe and sometimes is populated at the time of camera device manufacture based on the known configuration and orientation of the camera modules in the camera device 202.

Figures 18, 18A, 18B:
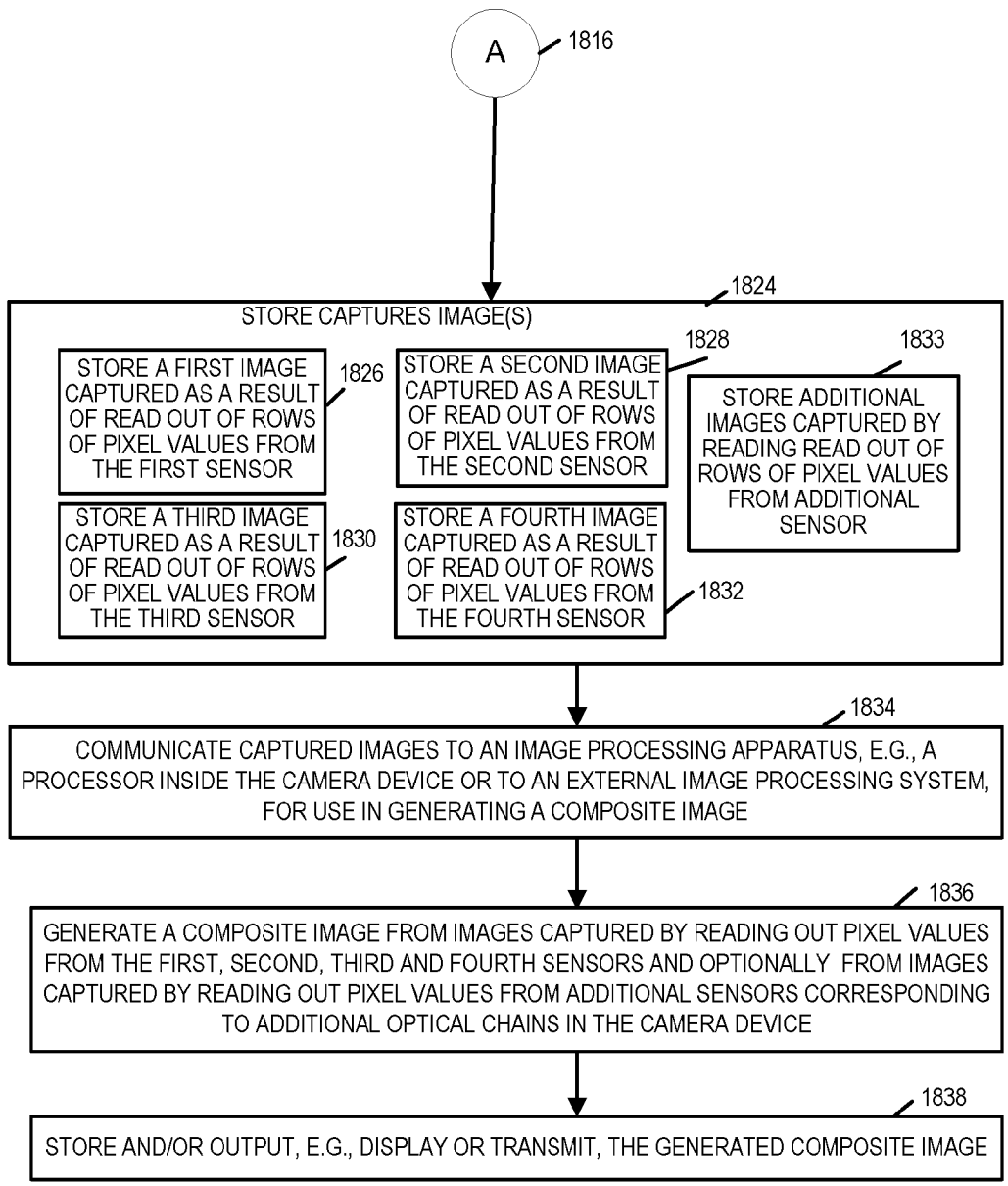
FIG. 18A is a first part of a flow chart illustrating the steps of a method of operating a camera device including multiple optical chains in accordance with one embodiment.
FIG. 18B is a second part of a flow chart illustrating the steps of a method of operating a camera device including multiple optical chains in accordance with one embodiment.
FIG. 18 illustrates that FIGS. 18A and 18B are to be interpreted in combination as parts of a single flow chart of FIG. 18.
Figure 18A:
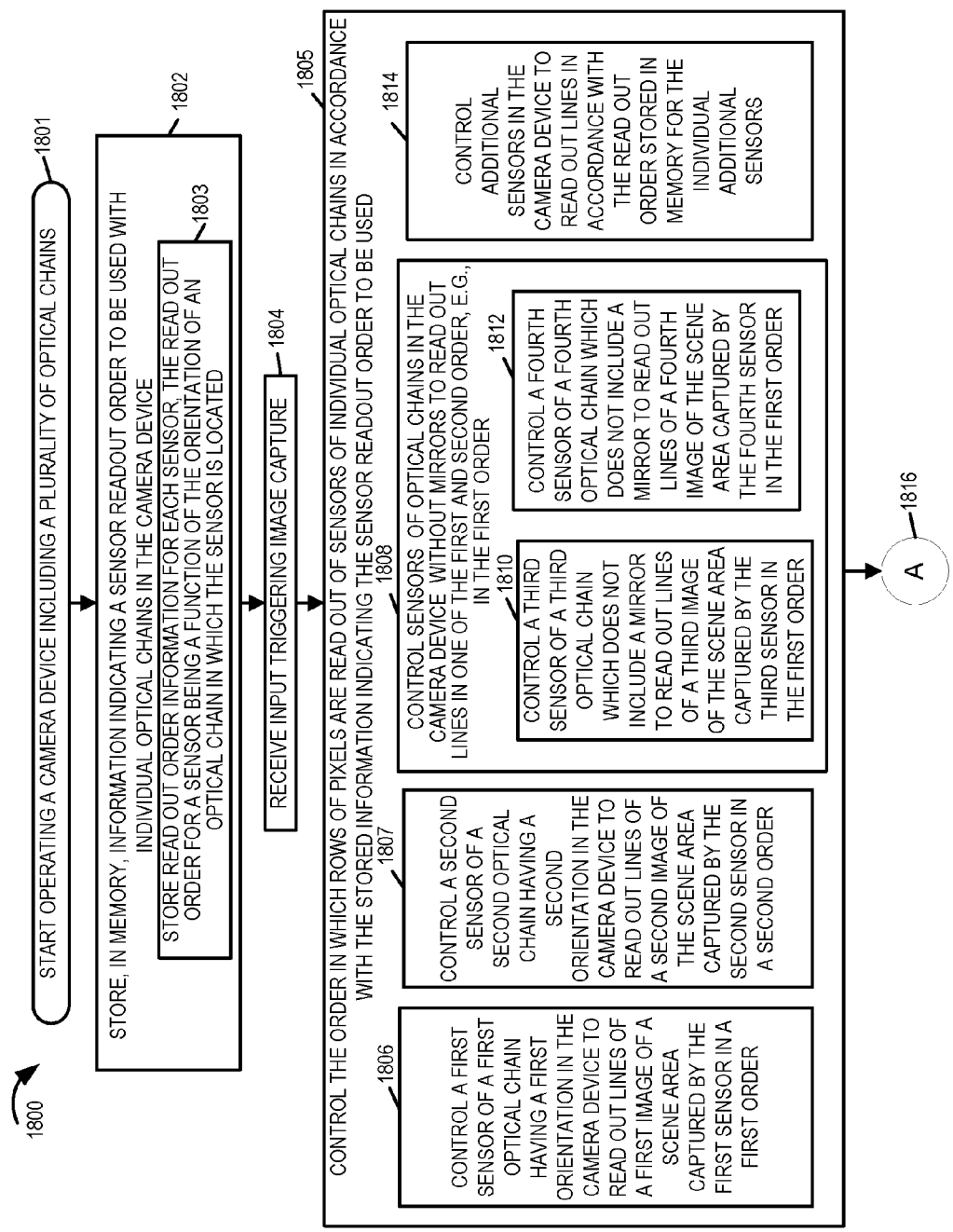

FIG. 18, which comprises the combination of FIGS. 18A and 18B, is a flowchart 1800 illustrating the steps of an exemplary method of controlling a camera device, e.g., camera 202, that includes sensors with a rolling shutter to read out rows of pixel values from image sensors in a coordinated manner in accordance with an exemplary embodiment. The camera device implementing the method of flowchart 1800 can and sometimes does include the same or similar elements as the camera device 100 of FIG. 1 and maybe an sometimes is the camera device 202 of FIG. 2. The modules of the camera device 202 can be arranged as shown in FIGS. 3A and 3B.

The exemplary method starts in step 1801. For the purposes of discussion consider that the camera device 202 includes a plurality of optical chains, e.g., camera modules, which can be operated and controlled independently and/or in a coordinated manner.

Operation proceeds from start step 1801 to step 1802 in which information indicating a sensor readout order to be used with individual optical chains in the camera device is stored in memory, e.g., in information table 1900. The initial storing may be done at the time of manufacture with the storing then being performed on an ongoing basis as the information is retained, i.e., stored, in the memory of the camera device 202.

In some embodiments step 1802 includes step 1803 where read out information for each sensor corresponding to each of the optical chains in the camera device is stored, with the read out order for a sensor being a function of the orientation of an optical chain, and thus direction of the optical axis of the optical chain, in which the sensor is located. An exemplary stored information table including read out order information is shown in FIG. 19 as table 1900.

The read out order in the stored information for a sensor of a given optical chain indicates the order in which rows of pixel elements of the sensor are read out, e.g., from the top of the sensor towards the bottom of the sensor or from bottom of the sensor towards the top of the sensor in accordance with the features of the present invention. Such a readout is sometimes referred to as a rolling shutter readout operation.

Operation proceeds from step 1803 to step 1804. In step 1804 the camera device receives user input triggering image capture. For example a user may press a button on camera device 202 used to trigger image capture by multiple optical chains whose images can then be combined to generate a composite image.

Operation proceeds from step 1804 to step 1805. In step 1805 the order in which rows of pixels are read out of sensors of individual optical chains in the camera device is controlled, e.g., by the read out controller 150, in accordance with the stored information indicating the sensor readout order to be used. Thus in step 1805 the stored read out order information is used by the camera device 202 to control read out operation of sensors of various camera modules included in the camera device, e.g., at least some of the camera modules having different orientations as part of a non-uniform arrangement of camera modules in the camera device 202. In various embodiments step 1805 includes steps 1806, 1807, 1808, and 1814, one or more of which are performed as part of step 1805.

In step 1806 a first sensor, e.g., sensor 368, of a first optical chain, e.g., OC 316, having a first orientation in the camera device 202 is controlled to read out lines of a first image of a scene area captured by the first sensor in a first order, e.g., an order proceeding from a top of the first sensor to the bottom of the first sensor. Thus in some embodiments the read out of lines of an image captured by the first sensor which corresponds to the rows of pixel elements of the first sensor is performed in a first read out order with, e.g., the read out according to first order proceeding from top of the first sensor to the bottom of the first sensor. In some embodiments reading of lines captured by a first group of sensors corresponding to different optical chains having the same or similar orientation is controlled to proceed in accordance with the first read out order.

In step 1807 a second sensor, e.g., sensor 352, of a second optical chain, e.g., OC 322, having a second orientation in the camera device 202, which is different from the first orientation, is controlled to read out lines of a second image of the scene area captured by the second sensor in a second order, e.g., an order proceeding from a bottom of the second sensor to the top of the second sensor. In some embodiments reading of lines captured by a second group of sensors corresponding to different optical chains is controlled to proceed in accordance with the second read out order. In some embodiments the first optical chain is oriented in the camera device at approximately 180 degrees relative to the second optical chain, e.g. with the optical axis in the optical chains extending in opposite directions. In some embodiments the first and second optical chains each include a mirror. In some embodiments the first and second optical chains are of the same type but differ in orientation in the camera device. In some embodiments the first and second optical chains have the same focal length and the first and second sensors are of the same size and have same number of lines of pixel elements for sensing pixel values. Thus the first and second optical chains are the same or similar and differ in some embodiments only in terms of their orientation and how they are controlled to read out lines of an image.

In step 1808 the sensors of optical chains which do not include mirrors are controlled to read out lines in one of the first or second order, e.g., first order in some embodiments. As part of step 1808 steps 1810 and 1812 are performed in some embodiments. In step 1810 a third sensor, e.g., sensor 380, of a third optical chain, e.g., OC 334, which does not have a mirror is controlled to read out lines of a third image of the scene area captured by the third sensor in the first order. In step 1812 a fourth sensor, e.g., sensor 374, of a fourth optical chain, e.g., OC 326, which does not have a mirror is controlled to read out lines of a fourth image of the scene area captured by the fourth sensor in the first order. In some embodiments where additional sensors corresponding to the optical chains without mirrors are used to capture images, the sensors are controlled to read out lines in accordance with the first order.

In step 1814 additional sensors corresponding to additional optical chains in the camera device are controlled to read out lines in accordance with the read out order stored in the memory for the additional individual sensors. This involves, in some embodiments controlling each of the sensors of the optical chains listed in table 1400 to read out lines in the order indicated in table 1900 so that each of the camera modules captures an individual image that can be combined with one or more images captured by the other camera modules to form a composite image. While all camera modules maybe used at a given time in parallel, in some embodiments a subset of modules is used at a given time with the subset depending on one or more user settings, e.g., zoom settings.

In some embodiments steps 1806, 1807, 1808, 1814 are performed in parallel during the same time period with images being captured at the same time or with expose times that overlap in the case where different modules may be controlled to use different exposure times. Operation proceeds from step 1805 (including steps 1806 through 1814) to step 1824 via connecting node A 1816.

In step 1824 images captured by the sensors of the camera modules are stored. The image captured by a sensor is the set of pixel values read out from the sensor. Each line of pixel values read out of a sensor normally corresponds to a line of the image captured by the sensor. Depending on the embodiment some or all of the sensors may capture images which are stored, e.g., in memory 108 of the camera device, in step 1824. As part of step 1824 one or more of the storing steps 1826, 1828, 1830, 1832, 1833 are performed in some embodiments. For discussion purposes consider that an image is captured by each of the sensors, e.g., as a result of sensor read out operation of the first, second, third and fourth sensors as well as the other sensors in the camera device 202. Thus in such a case as part of step 1824 steps 1826, 1828, 1830, 1832 and 1833 are performed. In step 1826 a first image, captured as a result of read out of rows of pixel values from the first sensor, is stored. In step 1828 a second image, captured as a result of read out of rows of pixel values from the second sensor, is stored. In step 1830 a third image, captured as a result of read out of rows of pixel values from the third sensor, is stored. In step 1832 a fourth image, captured as a result of read out of rows of pixel values from the fourth sensor, is stored. In step 1833 the additional images captured by the sensors of the additional optical chains listed in table 1900 are stored.

Operation proceeds from step 1824 to step 1834. In step 1834 the captured image(s), e.g., the pixel values read out of from the sensors, are communicated to an image processing apparatus, e.g., a computer or processor of the camera device implementing the method, e.g., processor 110, or an external image processing system for additional processing, e.g., in generating a composite image. The captured image(s) may be communicated via local network/bus 116 in the case where images are supplied to camera device processor, or via an interface such as interface 114 of camera 100 in the case where images are supplied to an external system. Operation proceeds from step 1834 to step 1836 which may be performed by the processor of the camera device 202 or an external processing system. In step 1836 a composite image is generated from images captured by reading out pixel values from the first, second, third and fourth sensors and optionally also from images captured by reading out pixel values from additional sensors in the camera device. Operation proceeds from step 1836 to step 1838 where the generated composite image is stored and/or output, e.g., transmitted and/or displayed. The composite image maybe and sometimes is displayed on the display of the camera device implementing the method.

In one exemplary embodiment an imaging device such as e.g., the camera device 100, is used to implement the method of flowchart 1800. In one particular exemplary embodiment the plurality of optical chains 130 of the camera device 100 include optical chains, e.g., camera modules, arranged in the manner as illustrated in FIGS. 3A-3B. Thus in some such embodiments the plurality of optical chains 130, e.g., camera modules, includes a first optical chain, a second optical chain, a third optical chain and a fourth optical chain. In some embodiments the controller 150 which is a rolling shutter controller in some embodiments is configured to control a plurality of image sensors, corresponding to the plurality of camera modules 130, to perform read out of sensor rows in accordance with the read out order information stored in memory 108 as discussed with regard to flowchart 1800. In one such embodiment the controller 150 (including the sensor read out controller 289) is configured to: control reading out of pixel values from a first sensor (368 or 362) of said first optical chain (316 or 310) and a second sensor (352 or 372) of said second optical chain (322 or 320), the controller (150) being configured to: control said first sensor (368 or 362) to read out lines of a first image (1500) of a scene area (1400) captured by said first sensor (368 or 362) in a first order, said first order being an order proceeding from a top of the first sensor (368 or 362) to the bottom of the first sensor (368 or 362); and control said second sensor (352 or 372) to read out lines of a second image (1600) of the scene area (1400) captured by said second sensor (352 or 372) in a second order, said second order being an order proceeding from a bottom of the second sensor (352 or 372) to the top of the second sensor (352 or 372). In some embodiments the camera device includes memory (108) for storing the first and second images (1500, 1600).

In some embodiments the first optical chain (316 or 310) is oriented in the camera device (202) 180 degrees relative to the second optical chain (322 or 320). In some embodiments the first (316 or 310) and second (322 or 320) optical chains each include a mirror (710). In some embodiments the first (316 or 310) and second (322 or 320) optical chains are of the same type but differ in orientation in the camera device (202). In some embodiments the first (316 or 310) and second (322 or 320) optical chains have the same focal length and the first (368 or 362) and second (352 or 372) sensors are of the same size and have same number of lines of pixel elements for sensing pixel values.

In some embodiments the camera device further includes memory 108 including stored information indicating a sensor readout order to be used with individual optical chains in the camera device (202). In various embodiments the controller (150) is configured to control the order in which rows of pixels are read out of the first (368 or 362) and second (352 or 372) sensors in accordance with the stored information indicating the sensor readout order to be used.

In some embodiments the first sensor (362) is mounted at a first angle relative to a base (973) of the first optical chain (310). In some embodiments the second sensor (372) is mounted at the first angle relative to a base (973) of the second optical chain (320). In some embodiments the first optical chain (310) is mounted at a first angle relative to a bottom (207) of the camera device (202) and wherein the second optical chain (320) is mounted at a second angle relative to the bottom (207) of the camera device (202), the second angle relative to the bottom (207) of the camera device (202) being 180 degrees or approximately 180 degrees from the first angle relative to the bottom (207) of the camera device (202).

In some embodiments the first and second angles relative to the bottom (207) of the camera device (202) are angles that result in the first (310) and second (320) optical chains extending in directions which are not perpendicular to the bottom (207) of the camera device (202). In some embodiments the camera device (202) further comprises: i) a third optical chain (334) which does not include a mirror and which includes a third sensor (380) and ii) a fourth optical chain (328) including which does not include a mirror and which includes a fourth sensor (376). In some such embodiments the controller (150) is further configured to control sensors (380, 376) of optical chains in the camera device (202) without mirrors to read out lines in the first order.

In some embodiments the controller is further configured to determine if an image is captured by at least one image sensor, e.g., first image sensor. In some embodiments the controller 150 is further configured to control one or more sensors to read out additional rows of pixel values in the manner discussed in flowchart 1800 so that a complete image is captured by one or more of the individual sensors of the optical chains.

In some embodiments the camera device further includes a processor, e.g., processor 110. In some embodiments the processor 110 is configured to store an image(s) captured by each of the sensors, e.g., as a result of sensor read out operation of sensors, in memory 108. In some embodiments the processor 110 is further configured to generate a composite image from images captured by reading out pixel values from the first, second, third and fourth image sensors. In some embodiments the processor 110 is further configured to control the camera device to store, e.g., in memory 108, and/or output the composite image. In some embodiments controlling the camera to output the composite image includes controlling the camera to transmit, e.g., via a transmission interface 114, to an external device and/or display the composite image, e.g., on display 102.

In various embodiments the read out controller 150 (that includes sensor read out controller) alone, or under direction of the processor 110, controls each of the image sensors of the camera device to perform a read out of pixel values, e.g., rows of pixel values, in the manner as discussed above. The pixels read out form an image read out from the sensor.

While one or more steps of the method 1800 have been discussed as being performed by a processor, e.g., processor 110, it should be appreciated that one or more of the steps may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 1800 therein providing additional image processing efficiency, accuracy and/or operational capability to the imaging device, e.g., camera, implementing the method. In some embodiments the method and apparatus are implemented fully in hardware.

At least one exemplary method is directed to a method of operating a camera device (202) including a plurality of optical chains where the method includes controlling a first sensor (368 or 362) of a first optical chain (316 or 310) having a first orientation in the camera device (202) to read out lines of a first image (1500) of a scene area (1400) captured by said first sensor (368 or 362) in a first order, said first order being an order proceeding from a top of the first sensor (368 or 362) to the bottom of the first sensor (368 or 362), controlling a second sensor (352 or 372) of a second optical chain (322 or 320) having a second orientation in the camera device to read out lines of a second image (1600) of the scene area (1400) captured by said second sensor (352 or 372) in a second order, said second order being an order proceeding from a bottom of the second sensor (352 or 372) to the top of the second sensor (352 or 372) and storing the first and second images (1500, 1600) in memory (108). In at least one exemplary embodiment of the method the first optical chain (316 or 310) is oriented in the camera device (202) 180 degrees relative to said second optical chain (322 or 320). In such an embodiment the first optical chain and the second optical chain have optical axis extending in opposite directions. In some embodiments the first (316 or 310) and second (322 or 320) optical chains each include a mirror (710). In some embodiments the first (316 or 310) and second (322 or 320) optical chains are of the same type but differ in orientation in said camera device (202). In such embodiments the first and second optical chains maybe the same in terms of physical structure including sensor, mirror placement in the module and orientation of the sensor on a mounting board but with the first and second optical chains differing in the orientation at which they are mounted in the camera device. In some embodiments the first (316 or 310) and second (322 or 320) optical chains have the same focal length and the first (368 or 362) and second (352 or 372) sensors are of the same size and have same number of lines of pixel elements for sensing pixel values.

The exemplary method in some embodiments includes storing in memory (108) information indicating a sensor readout order to be used with individual optical chains in said camera device (202); and controlling the order in which rows of pixels are read out of said first (368 or 362) and second (352 or 372) sensors in accordance with the stored information indicating the sensor readout order to be used. The information maybe stored in table 1900 shown in FIG. 19. In some implementations of the exemplary embodiment the first (368 or 362) and second (352 or 372) sensors are rolling shutter sensors, said first (368 or 362) and second (352 or 372) sensors reading out different rows of pixel values at different times in an order which matches the order in which each of the first and second sensor is controlled to read out rows of pixel values. In some embodiment the first sensor (362) is mounted at a first angle relative to a base (973) of said first optical chain (310), the second sensor (372) is mounted at the first angle relative to a base (973) of the second optical chain (320), and the first optical chain (310) is mounted at a first angle relative to a bottom (207) of the camera device (202) and the second optical chain (320) is mounted at a second angle relative to the bottom (207) of the camera device, the second angle relative to the bottom (207) of the camera device (202) being 180 degrees or approximately 180 degrees from the first angle relative to the bottom (207) of the camera device (202). In some embodiments the first and second angles relative to the bottom (207) of the camera device (202) are angles that result in said first (310) and second (320) optical chains having optical axis extending in directions (e.g. one of the directions being 45 degrees or approximately 45 degrees with respect to the bottom of the camera module) which are not perpendicular to the bottom (207) of said camera device (202). In some implementations of the exemplary embodiment the camera device includes i) a third optical chain (334) which does not include a mirror and which includes a third sensor (380) and ii) a fourth optical chain (328) including which does not include a mirror and which includes a fourth sensor (376); and the method further includes controlling sensors (380, 376) of optical chains in said camera device (202) without mirrors to read out lines in said first order.

When determining the angle of a camera module relative to the bottom of the camera device, the angle of the optical axis is used in some embodiments as a reference while in other embodiment the angle is determined using the side of the camera module housing as a reference. The side of the camera housing module can be used as the reference in some embodiments since the module housing in some implementation is rectangular and thus the side of the camera module in such embodiments extends parallel to the optical axis of the camera module of which the module housing is a part.

In accordance with various features the orientation of the camera modules is taken into consideration when configuring whether the sensors of the camera modules of the camera device shown in FIGS. 2 and 3 are to read out in the first or second directions. By taking into consideration the orientation of the sensors and controlling the readout direction taking into consideration sensor orientation, the time difference between when sensors of different modules capture the same scene portion can be reduced or minimized as compared to the case where all sensors are controlled to read out lines of pixel values in the same order.

The use of rotated sensors and control of sensor readout order in the above described manner allows the combining of images to generate a composite image to avoid the need for image rotation. Thus in at least some embodiments combining of images captured by camera modules having different orientations in the camera does not involve image rotation. However, all implementations need not preclude the rotation of one or more of the images as part of the combining process and some images may be rotated as part of the combining in some embodiments to generate a composite image.

In some embodiments the first and second camera modules used to implement the method are mounted at an angle relative to the bottom of said camera device and wherein said third camera module is mounted so that the bottom of the third sensor extends left to right in said camera device parallel to the bottom of the camera device. In various embodiments sensors are mounted on printed circuit boards (PCBs) at different angles taking into consideration the angles at which camera modules maybe mounted in a camera device. By mounting the sensors at different angles for different camera modules take into consideration how the module will be mounted in a camera case, the flat bottom portion of the camera module can be easily secured to a mounting board in a camera and the camera modules can be positioned at the desired angle relative to the bottom of the mounting board which normally corresponds to the bottom of the camera case in which the mounting board and camera modules are mounted. Thus, while a variety of rectangular camera modules having mounting flat bottoms which are used as mounting bases maybe used, different camera modules may and sometimes will have sensors which are rotated relative to the bottom of the camera module to take into consideration the angle at which the camera module will be mounted to the mounting board of the camera.

Camera modules without mirrors may and sometimes are mounted with their sensor mounting boards extending parallel to the camera module mounting board of the camera to which the camera modules are secured. In such embodiments the back of the camera modules without mirrors maybe secured to the sensor mounting board with the optical axis of the camera module facing straight out through the front of the camera.

Camera modules with mirrors may and sometimes do have their sensors mounted perpendicular to the sensors of the camera modules without mirrors. While the sensors of camera modules with mirrors may and sometimes do extend in the back to front direction of the camera case in which the camera modules are mounted, the camera modules with mirrors maybe mounted at angles relative to the bottom of the camera case. The angle at which a sensor is mounted relative to a mounting surface, e.g., flat top or bottom surface of the camera module in which the sensor is included, in some embodiments is a function of the angle at which the camera module will be mounted relative to the bottom of the camera case in which the camera module is being mounted. In at least some such embodiments the mounting surface, e.g., top or bottom surface, of a camera module including a mirror is secured to the mounting board of the camera to which the front or back of a camera module which does not include a mirror is secured. As should be appreciated holes maybe included in the mounting board to allow light to pass in cases where the front or top of a camera module serves as the camera module mounting surface.

Various embodiments are particularly well suited to facilitate incorporating multiple, e.g., two, three or more, optical chains into a single camera device where physical space maybe limited and/or for technical reasons it may be desirable to have different optical chains oriented within the body of a camera device differently, e.g., in a non-uniform array. The methods and apparatus where camera modules including mirrors maybe mounted at different angles relative to a side or bottom surface of a camera are described in various embodiments.

In some embodiments, an optical chain, e.g., camera module, includes one or more lenses and a sensor. In some embodiments the sensor is placed on a printed circuit board (PCB). The entire module or a portion of the module maybe enclosed in a housing. The components mounted in the housing of a camera module normally but not always include the sensor of a camera module and a printed circuit board (PCB) on which the sensor is mounted. The sensor and PCB are often mounted in a camera module housing, e.g., a rectangular housing having a flat mounting surface. The flat mounting surface of a camera modules in some embodiments is suitable for securing the camera module, e.g., using screws, adhesive or other fasteners, to a camera module mounting surface, e.g., an aluminum mounting board which maybe mounted inside a camera case or serves as the front or back of the camera.

The rectangular camera module housing is sometimes referred to as a camera body but this should not be confused with the camera case which often houses multiple camera modules in the case of a camera which includes multiple camera modules.

In some particular embodiments the camera module housing is rectangular with the body being longer than it is tall in some cases. In other embodiments the camera housing maybe square when viewed from the front.

In such implementations the camera module housing normally includes a flat reference surface that allows easy mounting of the one or more camera modules of the camera to some other surface of the camera body. The PCB onto which a camera sensor is mounted itself may be rectangular although other shapes, such as squares or ovals, are possible but with most PCBs used for mounting having at least one edge which is substantially straight. Having one or more straight edges to the PCB also enables easy mounting.

In some embodiments the top or base of a camera module used for mounting or orientation of the module maybe used as a reference surface. Alternatively the back of a camera module housing may serve as a reference surface.

Some of the features related to a rotated sensor can be implemented and used in a single camera module. Thus in some embodiments a camera device may comprise one camera module. However, in various embodiments a camera device includes multiple different camera modules with at least some of the camera modules including mirrors and having sensors with different orientations. Thus in some embodiments a camera device may include a first camera module with a first mirror and a first sensor having a first orientation relative to the base of the first camera module and a second camera module with a second mirror and a second sensor, the second sensor having a different orientation relative to the mounting surface, e.g., base, the second camera module in which the second sensor is located. In addition to the first and second camera modules the camera device may also include camera modules without mirrors and which have sensors mounted so that the sensor and mounting board on which the sensor is located have the same orientation and with the mounting face of the camera module without the mirror corresponding to the back or front of the camera module rather than another face.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use. In some embodiments such cameras are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of operating a camera device including a plurality of optical chains, the method comprising:

controlling a first sensor of a first optical chain to capture lines of a first image of a scene area in a first order, said first optical chain having a first orientation in the camera device and including a first mirror, said first order being an order proceeding from a top of the first sensor to the bottom of the first sensor causing capture of the scene area by the first sensor in a first scene area capture direction;

controlling a second sensor of a second optical chain to capture lines of a second image of the scene area in a second order, said second optical chain having a second orientation in the camera device which is different from said first orientation and including a second mirror, said second sensor having a second light capture area which is oriented in a different direction in said camera device than a first light capture area of the first sensor, said second order being an order proceeding from a bottom of the second sensor to the top of the second sensor causing capture of the scene area by the second sensor in the first scene area capture direction; and storing the first and second images in memory.

2. The method of claim 1, wherein said first scene area capture direction is a top of scene area to bottom of scene area direction; and wherein said first optical chain is oriented in said camera device with the first light capture area of the first sensor facing in the direction of the second light capture area of the second sensor.

3. A method of operating a camera device including a plurality of optical chains, the method comprising:

controlling a first sensor of a first optical chain having a first orientation in the camera device to read out lines of a first image of a scene area captured by said first sensor in a first order, said first order being an order proceeding from a top of the first sensor to the bottom of the first sensor;

controlling a second sensor of a second optical chain having a second orientation in the camera device to read out lines of a second image of the scene area captured by said second sensor in a second order, said second order being an order proceeding from a bottom of the second sensor to the top of the second sensor; and storing the first and second images in memory;

wherein said first optical chain is oriented in said camera device 180 degrees relative to said second optical chain; and wherein said first and second optical chains each include a mirror.

4. The method of claim 3, wherein said first and second optical chains are of the same type but differ in orientation in said camera device.

5. The method of claim 3, wherein said first and second optical chains have the same focal length and the first and second sensors are of the same size and have same number of lines of pixel elements for sensing pixel values.

6. The method of claim 5, further comprising:

storing in memory information indicating a sensor readout order to be used with individual optical chains in said camera device; and controlling the order in which rows of pixels are read out of said first and second sensors in accordance with the stored information indicating the sensor readout order to be used.

7. The method of claim 6, wherein said first and second sensors are rolling shutter sensors, said first and second sensors reading out different rows of pixel values at different times in an order which matches the order in which each of the first and second sensor is controlled to read out rows of pixel values.

8. The method of claim 1, wherein the first sensor is mounted at a first angle relative to a base of said first optical chain;

wherein the second sensor is mounted at the first angle relative to a base of the second optical chain; and wherein said first optical chain is mounted at a first angle relative to a bottom of the camera device and wherein said second optical chain is mounted at a second angle relative to the bottom of the camera device, the second angle relative to the bottom of the camera device being 180 degrees or approximately 180 degrees from the first angle relative to the bottom of the camera device.

9. The method of claim 8, wherein said first and second angles relative to the bottom of the camera device are angles that result in said first and second optical chains extending in directions which are not perpendicular to the bottom of said camera device.

10. The method of claim 8, wherein the camera device further includes: i) a third optical chain which does not include a mirror and which includes a third sensor and ii) a fourth optical chain which does not include a mirror and which includes a fourth sensor; and wherein the method further comprises:

controlling sensors of optical chains in said camera device without mirrors to read out lines in said first order.

11. A camera device including a plurality of optical chains, comprising:

a first optical chain having a first orientation in the camera device, said first optical chain including a first sensor and a first mirror that directs light onto a light capture area of the first sensor;

a second optical chain having a second orientation in the camera device, said second optical chain including a second sensor and a second mirror that directs light on a light capture area of the second sensor, the first light capture area of the first sensor being oriented in a different direction within the camera device than the second light capture area of the second sensor;

a controller controlling reading out of pixel values from the first sensor of said first optical chain and the second sensor of said second optical chain, the controller being configured to:

control said first sensor to read out lines of a first image of a scene area captured by said first sensor in a first order, said first order controlling the first sensor to capture the scene area in a first scene area capture direction, said first order being an order proceeding from a top of the first sensor to the bottom of the first sensor; and control said second sensor to read out lines of a second image of the scene area captured by said second sensor in a second order, said second order being an order proceeding from a bottom of the second sensor to the top of the second sensor, said second order controlling the second sensor to capture the scene area in the first scene area capture direction; and memory including the first and second images.

12. The camera device of claim 11, wherein said first optical chain is oriented in said camera device 180 degrees relative to said second optical chain.

13. The camera device of claim 12, wherein said first and second optical chains each include a mirror.

14. The camera device of claim 13, wherein said first and second optical chains are of the same type but differ in orientation in said camera device.

15. The camera device of claim 13, wherein said first and second optical chains have the same focal length and the first and second sensors are of the same size and have same number of lines of pixel elements for sensing pixel values.

16. The camera device of claim 15, further comprising:
stored information indicating a sensor readout order to be used with individual optical chains in said camera device; and
wherein said controller is further configured to control the order in which rows of pixels are read out of said first and second sensors in accordance with the stored information indicating the sensor readout order to be used.

17. The camera device of claim 11, wherein the first sensor is mounted at a first angle relative to a base of said first optical chain;
wherein the second sensor is mounted at the first angle relative to a base of the second optical chain; and
wherein said first optical chain is mounted at a first angle relative to a bottom of the camera device and wherein said second optical chain is mounted at a second angle relative to the bottom of the camera device, the second angle relative to the bottom of the camera device being 180 degrees or approximately 180 degrees from the first angle relative to the bottom of the camera device.

18. The camera device of claim 17, wherein said first and second angles relative to the bottom of the camera device are angles that result in said first and second optical chains extending in directions which are not perpendicular to the bottom of said camera device.

19. The camera device of claim 17, further comprising:
i) a third optical chain which does not include a mirror and which includes a third sensor and ii) a fourth optical chain which does not include a mirror and which includes a fourth sensor; and
wherein the controller is further configured to control sensors of optical chains in said camera device without mirrors to read out lines in said first order.

20. A non-transitory machine readable medium for use in a camera device including a plurality of optical chains, the non-transitory machine readable medium including processor executable instructions which when executed by a processor cause said processor to:
control a first sensor of a first optical chain to capture lines of a first image of a scene area in a first order, said first optical chain having a first orientation in the camera device and including a first mirror, said first order being an order proceeding from a top of the first sensor to the bottom of the first sensor causing capture of the scene area by the first sensor in a first scene area capture direction;
control a second sensor of a second optical chain to capture lines of a second image of the scene area in a second order, said second optical chain having a second orientation in the camera device which is different from said first orientation and including a second mirror, said second sensor having a second light capture area which is oriented in a different direction in said camera device than a first light capture area of the first sensor, said second order being an order proceeding from a bottom of the second sensor to the top of the second sensor causing capture of the scene area by the second sensor in the first scene area capture direction; and
store the first and second images in memory.

21. The method of claim 2,
wherein the first and second optical chains have a configuration which is the same with respect to mirror position relative to sensor position within the optical chain; and
wherein the first optical chain is oriented in said camera 180 degrees relative to said second optical chain.

* * * * *